US007974913B1

(12) United States Patent
Morozov et al.

(10) Patent No.: US 7,974,913 B1
(45) Date of Patent: Jul. 5, 2011

(54) METHODS, COMPUTER SYSTEMS, AND SOFTWARE FOR ESTIMATING TRADING VOLUME

(75) Inventors: Vladimir Morozov, Manchester, CT (US); Ashutosh Goyal, Mumbai (IN); Gauravdeep S. Sagar, London (GB); Amit Manwani, New York, NY (US); Sami Haj Slimane, London (GB); Dragan Dacic, New York, NY (US)

(73) Assignee: Barclays Capital Inc., New York, NY (US)

( * ) Notice: Subject to any disclaimer, the term of this patent is extended or adjusted under 35 U.S.C. 154(b) by 331 days.

(21) Appl. No.: 12/182,900

(22) Filed: Jul. 30, 2008
(Under 37 CFR 1.47)

Related U.S. Application Data

(60) Provisional application No. 60/952,708, filed on Jul. 30, 2007.

(51) Int. Cl.
*G06Q 40/00* (2006.01)
(52) U.S. Cl. .................................................. 705/37

(58) Field of Classification Search .................. 705/37
See application file for complete search history.

(56) References Cited

U.S. PATENT DOCUMENTS

| 7,617,010 B2 * | 11/2009 | Bocharov et al. | 700/29 |
| 2004/0181491 A1 * | 9/2004 | Sato et al. | 705/63 |

OTHER PUBLICATIONS

Rangel, Jose Gonzalo; Stock Market Volatility and Price Discovery: Three Essays on the Effect of Macroeconomic Information, 2006.*
Fong Wai Mun and Yong Lawrence H.M.; Chasing Trends: recursive moving average trading rules and internet stocks; Journal of Empirical Finance, 12 (2005) 43-76.*
Campbell et al; Trading Volume and Serial Correlation in Stock Returns; The Quarterly Journal of Economics; vol. 108, No. 4 (Nov. 1993) pp. 905-939.*

* cited by examiner

*Primary Examiner* — Jagdish N Patel
(74) *Attorney, Agent, or Firm* — Morgan Lewis & Bockius LLP

(57) ABSTRACT

The disclosed technology involves estimating daily trading volume for a securities market for a next day, estimating daily trading volume for a particular security for a next day, and estimating intraday trading volume for a particular security for a next time bin in the current day.

72 Claims, 36 Drawing Sheets

Market Turnover

US 7,974,913 B1

METHODS, COMPUTER SYSTEMS, AND SOFTWARE FOR ESTIMATING TRADING VOLUME

CROSS REFERENCE TO RELATED APPLICATIONS

This application claims priority to U.S. Provisional Patent Application No. 60/952,708, filed Jul. 30, 2007. The entire contents of that provisional application are incorporated herein by reference.

BACKGROUND

Trading volume is a fundamental quantity generated by the market, and is the primary indicator of trading activity in a stock market [see reference 1, cited below]. The amount of trading volume reflects the liquidity of a security. The liquidity of a stock has a direct effect on the market impact of trading in the stock. Highly liquid stocks tend to have significantly lower market impacts compared with illiquid ones. Since the liquidity of a stock can vary over time and even within a day, predicting it is an important task [see reference 2].

Daily and intraday volume estimation can be used by traders to identify hard-to-trade securities. Moreover, volume estimation is important for pre-trade analytics. Trading volume supplies important information on current trading characteristics of securities in a portfolio. Trading volume also may be used as an input to quantitative analysis such as market impact calculations and trade scheduling. Thus it becomes extremely important to estimate this quantity accurately.

SUMMARY

One aspect of the disclosed technology will be referred to herein as "Daily Volume Estimation." In an embodiment, Daily Volume Estimation comprises a Daily Volume Estimation Model that applies one or more time-series techniques (such as trend removal, seasonal pattern extraction and ARMA fitting) to the time series of share turnovers of U.S. and European equities. "Turnover" of a stock is the number of shares traded daily divided by the total number of shares outstanding.

In an embodiment, the model uses ten years of historical data for calibration. Certain salient features of the model estimation process are summarized below.

1) Systematic seasonal patterns are extracted from the stock turnover time series using a standard statistical decomposition technique (LOESS—locally weighted scatterplot smoothing). To estimate a seasonal pattern for each stock, the normalized market turnover series is multiplied by the individual stock variability. Seasonal patterns may be expressed in normalized time (from 0 to 1) to take into account the varying number of trading days each year.
2) To forecast turnover for the next trading day, historical realized turnover is truncated at a maximum value of the mean+4*(standard deviation). This improves turnover forecasts following days of extremely high trading activity and reflects the fact that the market's response to a day of "extremely high" activity is proportionately less significant than its response to a day of "medium high" activity.
3) The impact of special market-pervasive events (like major index rebalances, option and future expiry, FOMC (Federal Open Market Committee) announcements, and days preceding market holidays) is estimated as an additive correction to daily turnover forecasts using standard statistical techniques.
4) In addition, stock specific corrections are made to the baseline turnover forecasts to account for the impact of earnings on trading volume. A standard earnings response function is estimated by normalizing and averaging the turnover response in an eleven day window around (five days prior to, the day of, and five days after) an earnings announcement for all stocks in the universe over the calibration period.
5) The entire calibration process is repeated at the end of every month.

In an embodiment, the Daily Volume Estimation Model gives an estimate of the trading volume for the next day. It can be used by traders, pre-trade analytics, and trading algorithms as a measure of estimated liquidity on a given day. The results of this model compare favorably with other methods such as n-day moving average and n-day median. The model can help traders, hedge funds and active managers understanding the daily liquidity and factors affecting it.

The model initially was developed for the U.S. markets and later extended to other exchanges (London, Milan, Paris, etc.). In this description, the model is primarily described in the U.S. context, and the data is U.S. data unless otherwise specified. However, those skilled in the art will understand that the description herein is equally applicable to other markets, with appropriate modifications that will be apparent to those skilled in the art.

In an embodiment, the volume estimation model is market-wide and may be used to estimate volume for the market as a whole as well as for individual stocks. In an embodiment, important seasonal and long term patterns are identified, as well as exceptional events that significantly affect the daily trading volumes. Such effects cause deviations from the assumption of stationarity of the time series, and need to be addressed separately. Some of these effects exist at market level (e.g., weekly patterns) where as others are stock specific (e.g., earning announcements). In an embodiment, market level effects are removed from the market data to obtain a stationary time series over which an ARMA (Autoregressive Moving Average) fitting is applied. The power of ARMA models is that they can incorporate both autoregressive terms and moving average terms. An embodiment uses an ARMA model to forecast volume for the next day at the market level as well as at the individual stock level. Finally, in this forecast all the identified patterns are added back sequentially to get an actual estimate.

In one embodiment, the disclosed technology involves a computer-implemented method for and software instructions for estimating the trading volume for a securities market for the next day. The disclosed technology involves electronically receiving time series data regarding securities trading volume for a securities market, removing market level effects from the time series data to produce a residual times series data, fitting an autoregressive moving average model to the residual time series data, and estimating the trading volume for the securities market for the next day based on the model's value at the next day. The disclosed technology includes software instructions that cause a computer to perform these features.

In one embodiment, the disclosed technology involves a computer-implemented method for and software instructions for estimating the trading volume for a security for the next day. The disclosed technology involves electronically receiving time series data regarding trading volume for a security traded in a securities market, removing market level effects and earnings effects from the time series data to produce residual time series data, fitting an autoregressive moving average model to the residual time series data, and estimating the trading volume for the security for the next day based on the model's value at the next day. The disclosed technology includes software instructions that cause a computer to perform these features.

Another aspect of the disclosed technology will be referred to herein as "Intraday Volume Estimation." In one embodiment, an Intraday Volume Decomposition Model provides dynamic estimations for the trading volume between any given moment of the day and the market close, at a single stock level. In one embodiment, the Intraday Volume Decomposition Model involves decomposing the trading volume for each stock into two parts: a market and a specific component. In one embodiment, these predictions are available and calibrated for stocks globally.

In one embodiment, the disclosed technology involves a computer-implemented method for and software instructions for estimating trading volume for a security for a time bin of the current day. The disclosed technology involves electronically receiving time series data regarding securities trading volume for a securities market up to a time bin, removing market level effects from the time series data to produce residual time series data up to the time bin, and estimating trading volume for the security for a subsequent time bin after the time bin based on the residual time series data up to the time bin. The disclosed technology includes software instructions that cause a computer to perform these features.

DETAILED DESCRIPTION

One aspect of the disclosed technology is referred to herein as "Daily Volume Estimation." The following description of Daily Volume Estimation is organized as follows. First, characteristics of study data and various seasonal patterns and special effects are described, and methodology of an embodiment for time series analysis to obtain the ARMA model is explained. Next is a description of how this process is adapted to predict volume for individual stocks. Subsequently, comparisons of predictions of the model of an embodiment are made with the standard moving average mean and median values, and conclusions are provided.

Study Data Used in an Embodiment

There are number of measures of trading volume. In one study used in an embodiment, turnover—the total number of shares traded divided by the total number of shares outstanding—is used as a measure of trading volume. Since the numbers of shares outstanding and the number of shares traded may change significantly over the period of the study, the use of turnover helps to reduce the low-frequency variation in the series [see reference 3]. Also in case of corporate actions like stock split number of stocks traded on the exchange might get double but the turnover would remain constant.

Data used in an exemplary analysis comprises daily turnover values since January 1996. In this example, data from January 1996 to December 2002 is used for model calibration and January 2003 to December 2006 data is used for estimating the quality of the predictions. Companies used had to have been trading in the market at least since January 1996.

Figure 1:
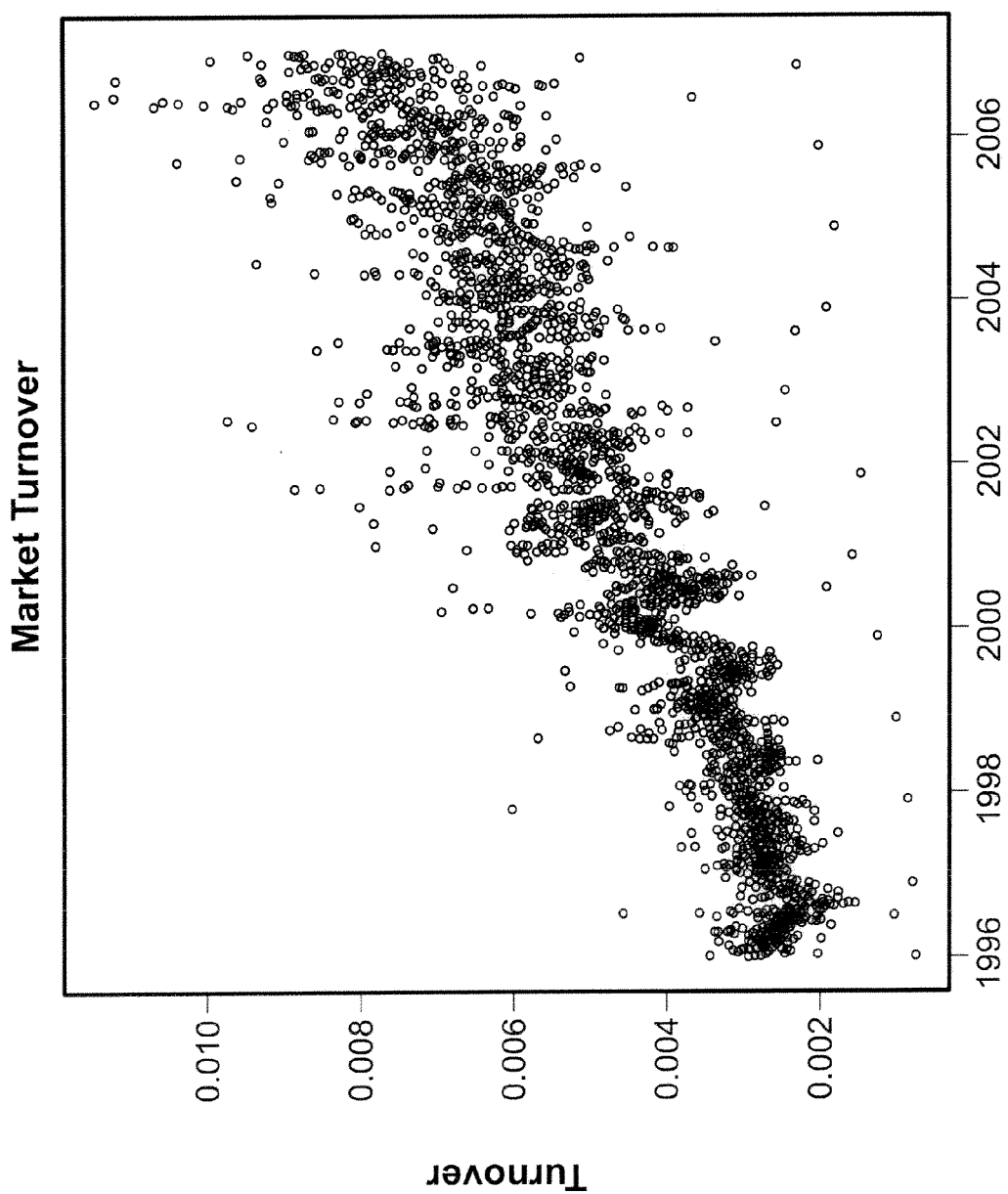
FIG. 1 illustrates a market turnover time series.

In this exemplary study, one first looks at the average market turnover over the 1996-2002 period. While computing this average, 5% of observations from each end of stock turnovers are ignored. This is done to filter out the huge spikes in the turnover series, which result in adding some noise to the original series. The data values for these dates are replaced with 10 day moving averages. The primary goal of this exercise is to identify any market level patterns in the time series. FIG. 1 shows market turnover data starting from 1996 to 2006. The data needs to be stationary over time for the analysis, but the plot for the turnover series above clearly suggests that the time series is non-stationary.

Figure 2:
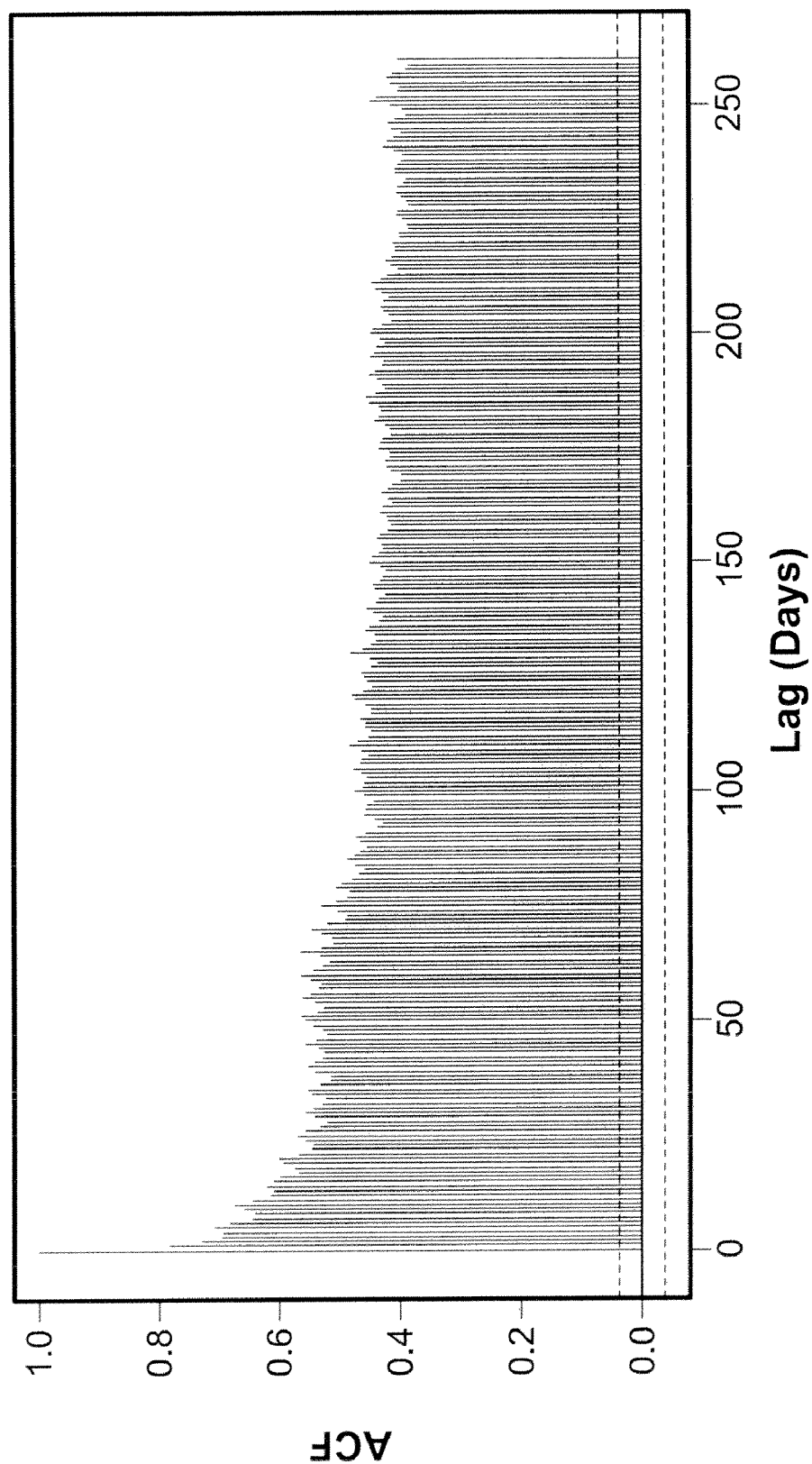
FIG. 2 illustrates an autocorrelation plot of a turnover time series.
Figure 3:
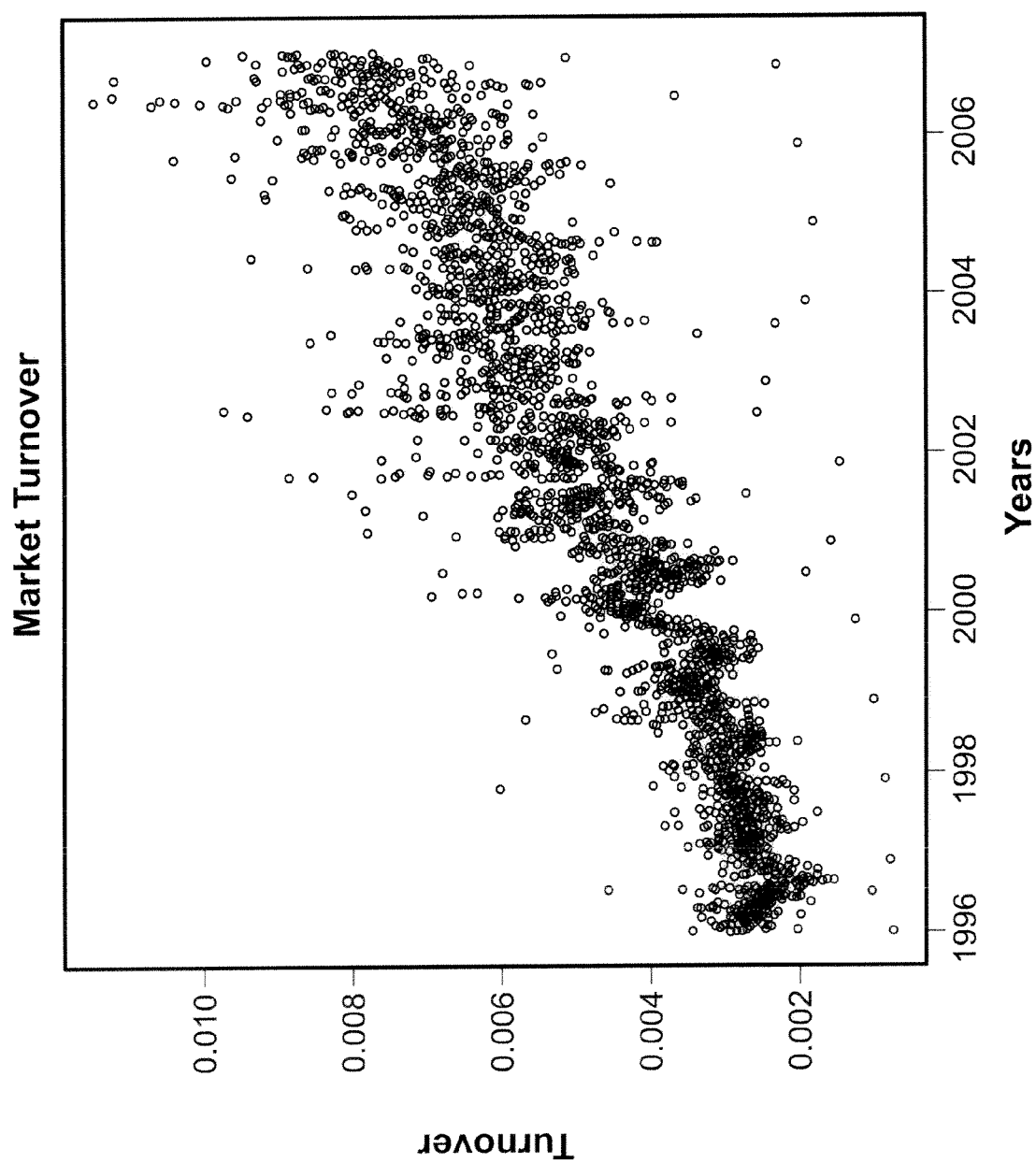
FIG. 3 illustrates an average market turnover time series.

FIG. 2 shows the autocorrelation function (ACF) for the turnover time series. The autocorrelations do not decay quickly. Moreover, spikes at lag=1 year suggest that the time series has a seasonal component with periodicity of 1 year. In addition, regularly appearing spikes in ACF with period 5 demonstrate that the series has another seasonal component with periodicity of 5 days (weekly). These patterns suggest that the data is non-stationary.

Long-Term Pattern/Trend and Variability

Figure 4:
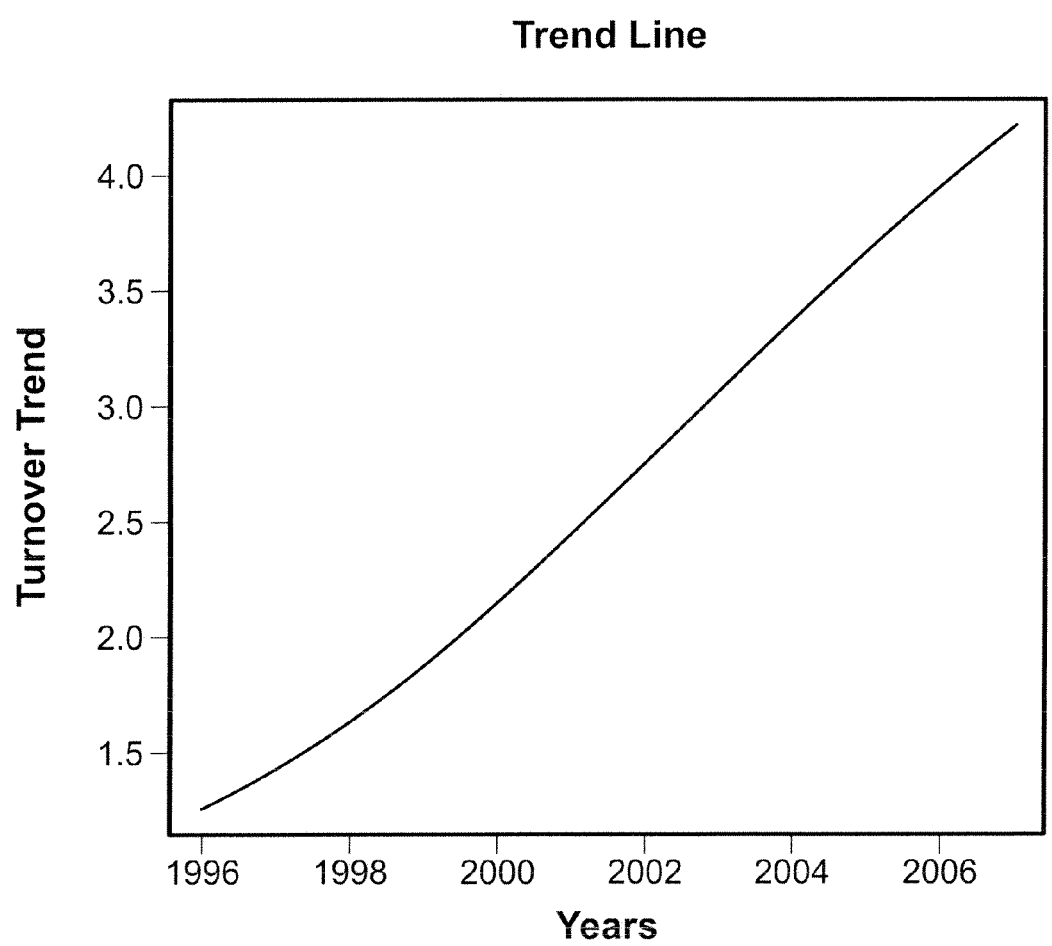
FIG. 4 depicts a turnover trend curve.

We first address the long-term increase in the average turnover rate across all the stocks. In the subject example, we fitted a curve for the trend in turnover data. FIG. 4 shows this curve as a function of time.

Figure 5:
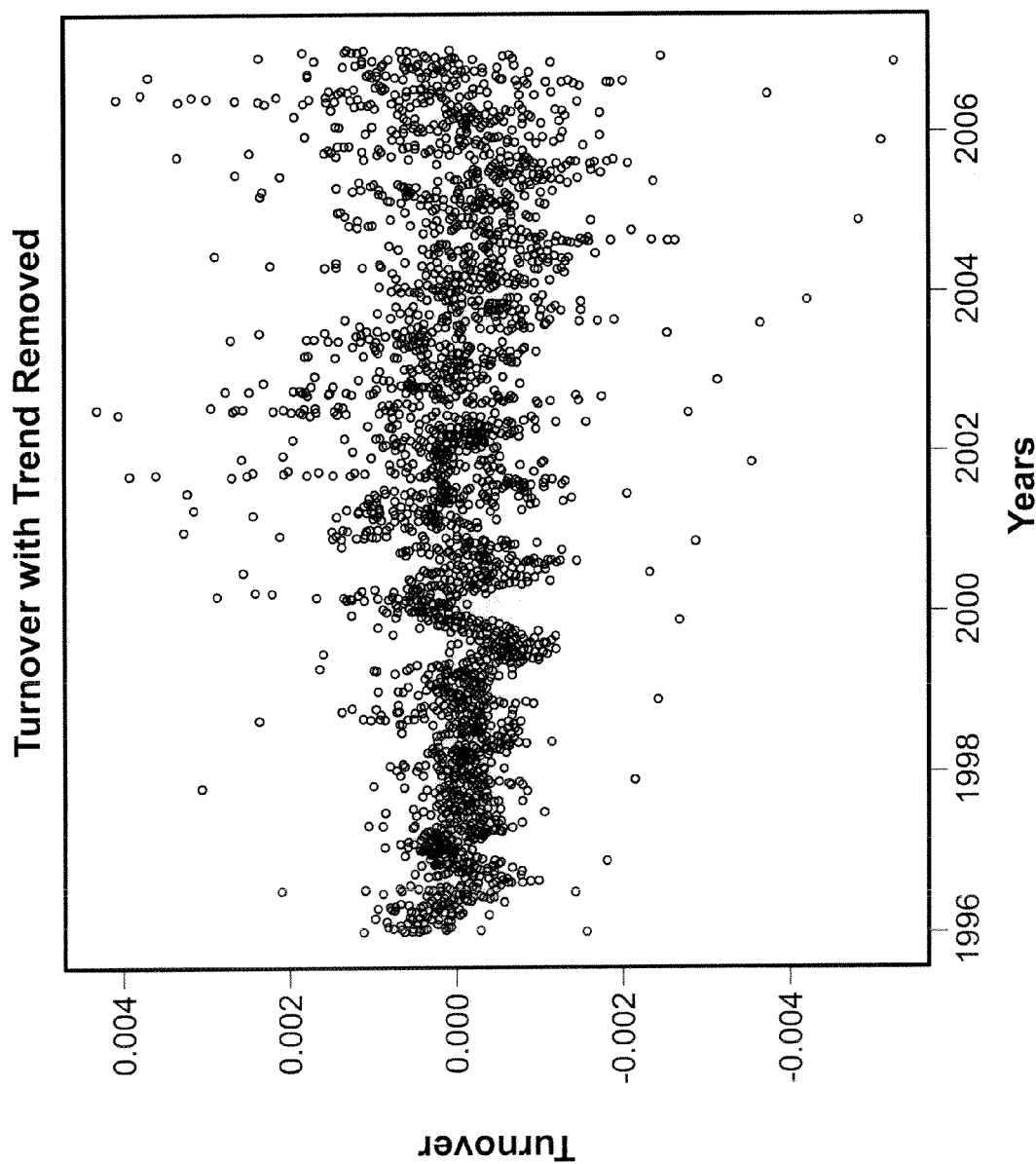
FIG. 5 depicts an average market turnover profile, with trend removed.
Figure 6:
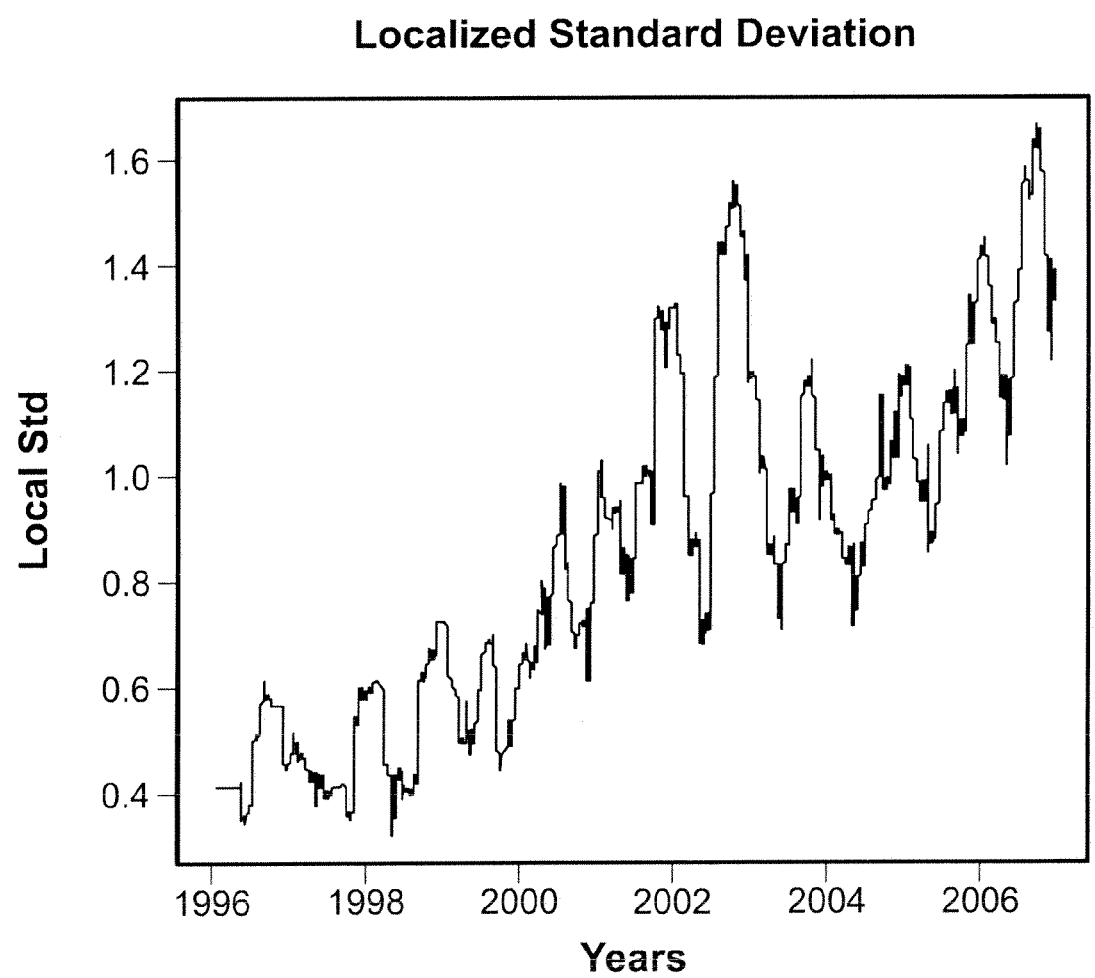
FIG. 6 depicts a local variance curve.

Once we remove this trend and take the residual, we see a pattern of increasing variability of turnover. FIG. 5 shows the plot of the residual time-series after removing the trend. We use local variance normalizing (see FIG. 6) to remove this pattern. For each point, local variance is estimated by taking a standard deviation over the past 100 values, and the residual series is divided by local variance series to get a normalized series.

Figure 7:
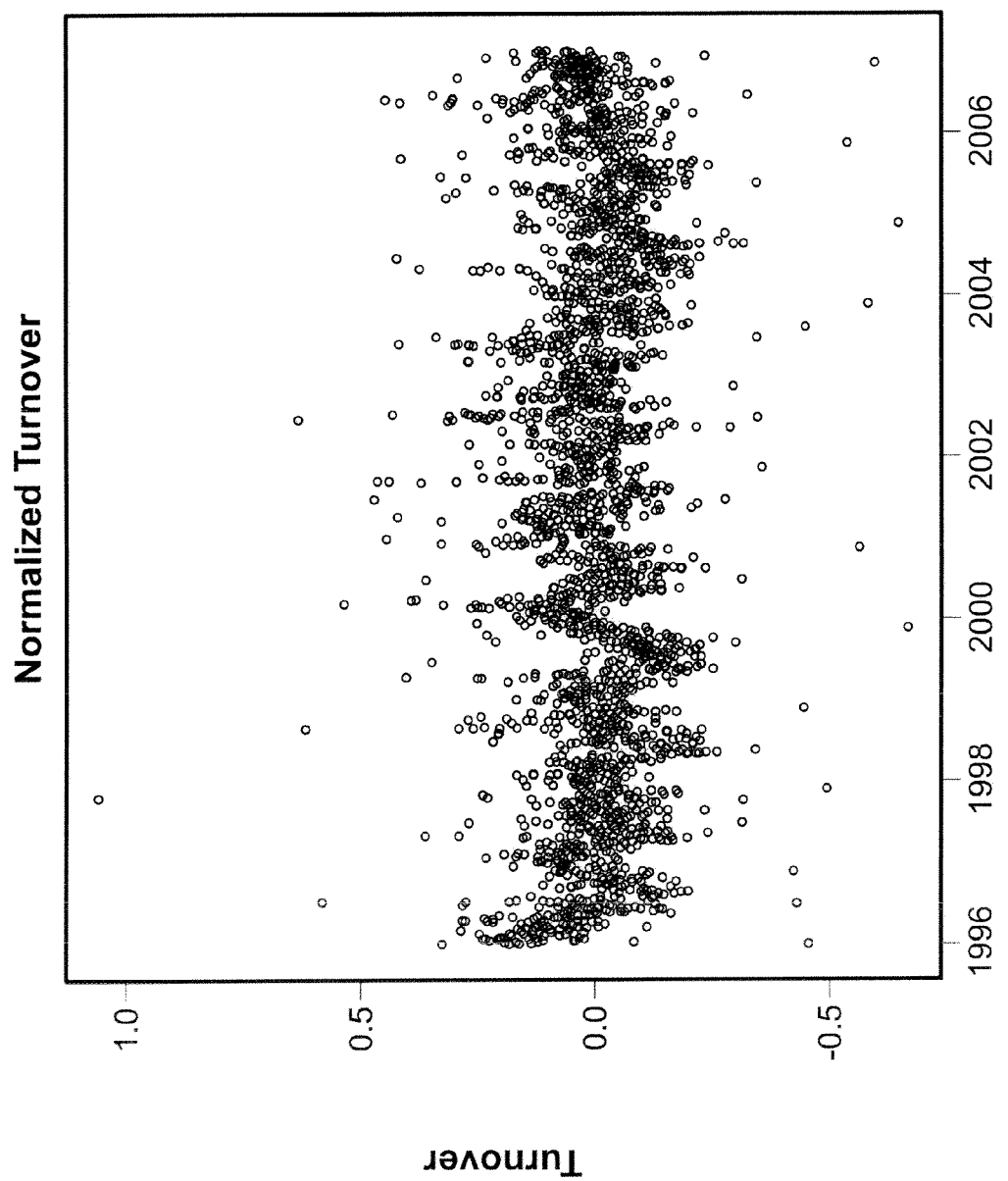
FIG. 7 illustrates an average market turnover profile adjusted for trend and variability.

After removing the long-term increase and variability trends from the time-series, we obtain the residuals for further study (see FIG. 7). There are no other apparent long-term trends/patterns in this data plot.

Seasonal Patterns

Figure 8:
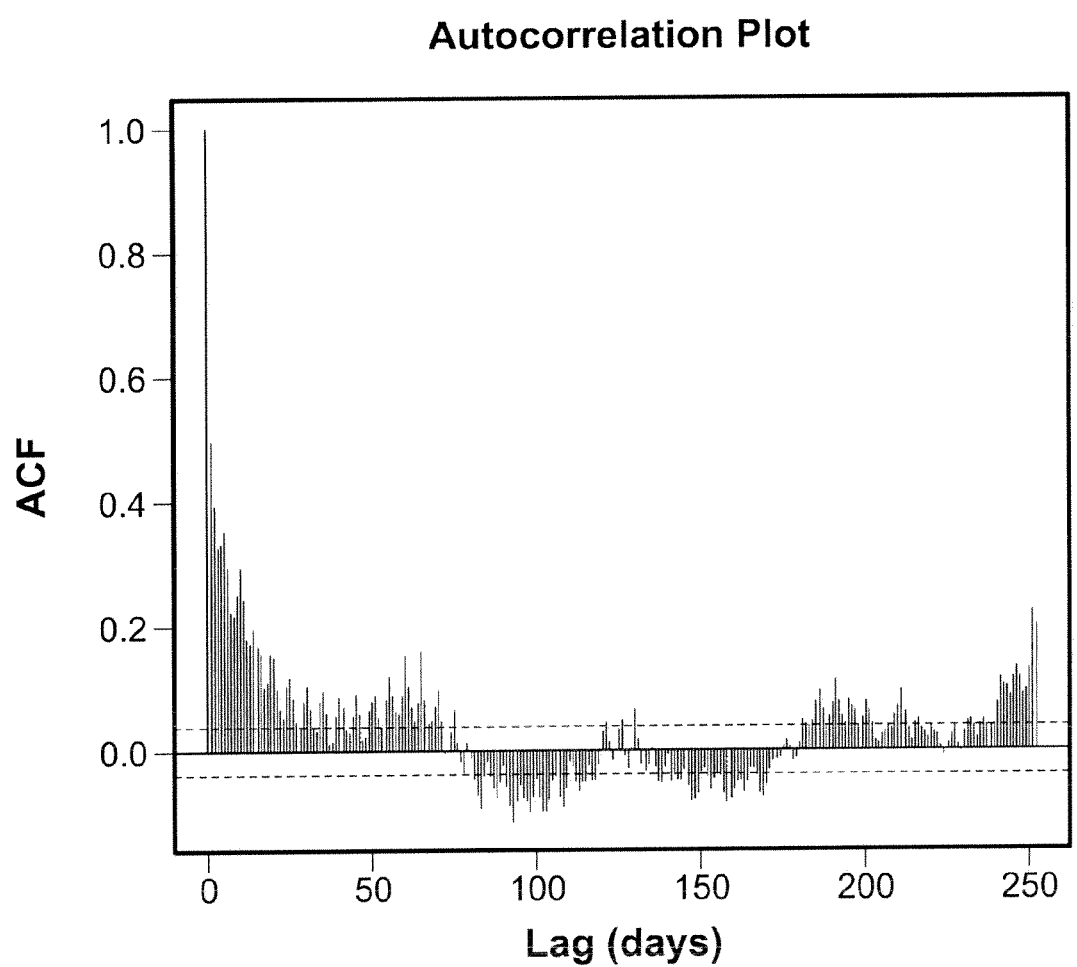
FIG. 8 depicts an autocorrelation plot.
Figure 9:
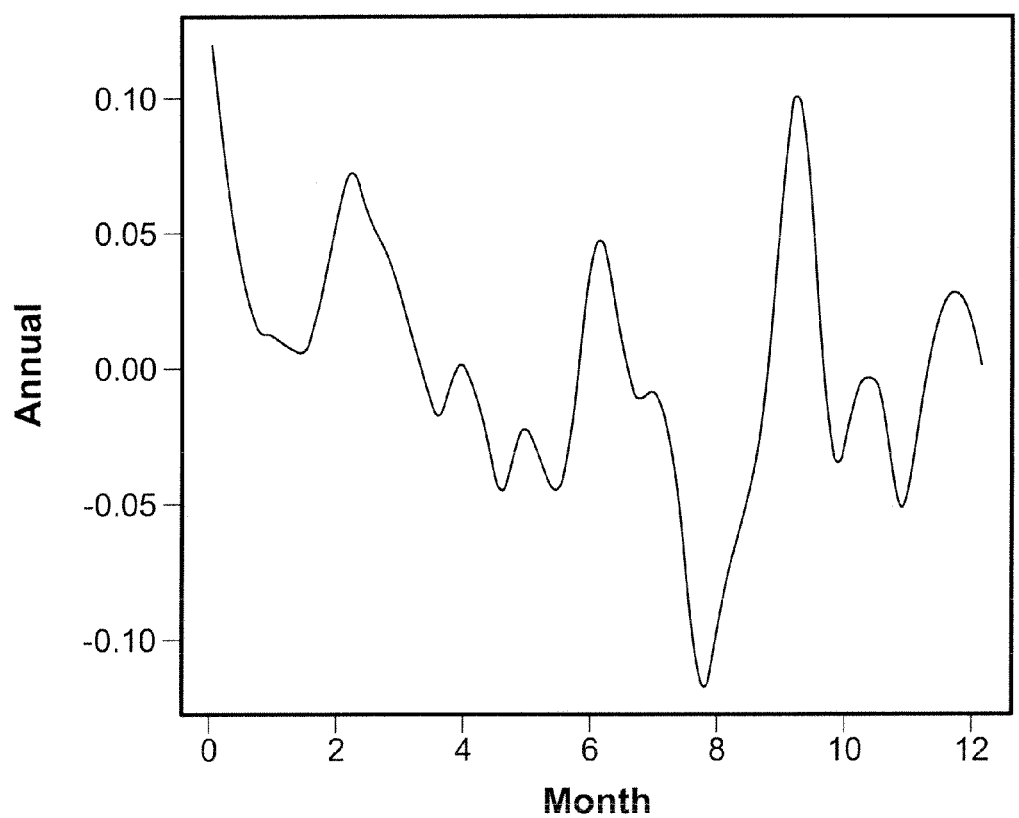
FIG. 9 depicts an annual pattern identified by a LOESS method.

In order to identify seasonal effects in the exemplary data, we start by studying the autocorrelation function plot of the residual time-series to check the existence of any patterns. As expected, we see a strong annual pattern in the form of a strong spike at lag 250 (see FIG. 8). We used the LOESS model to extract the annual patterns from this data. LOESS computes local estimates of the fit function to obtain a global fit for the data. The primary advantage of this method is that it is able to identify arbitrary fits for the data automatically. FIG. 9 shows an annual pattern identified by the LOESS method.

Figure 10:
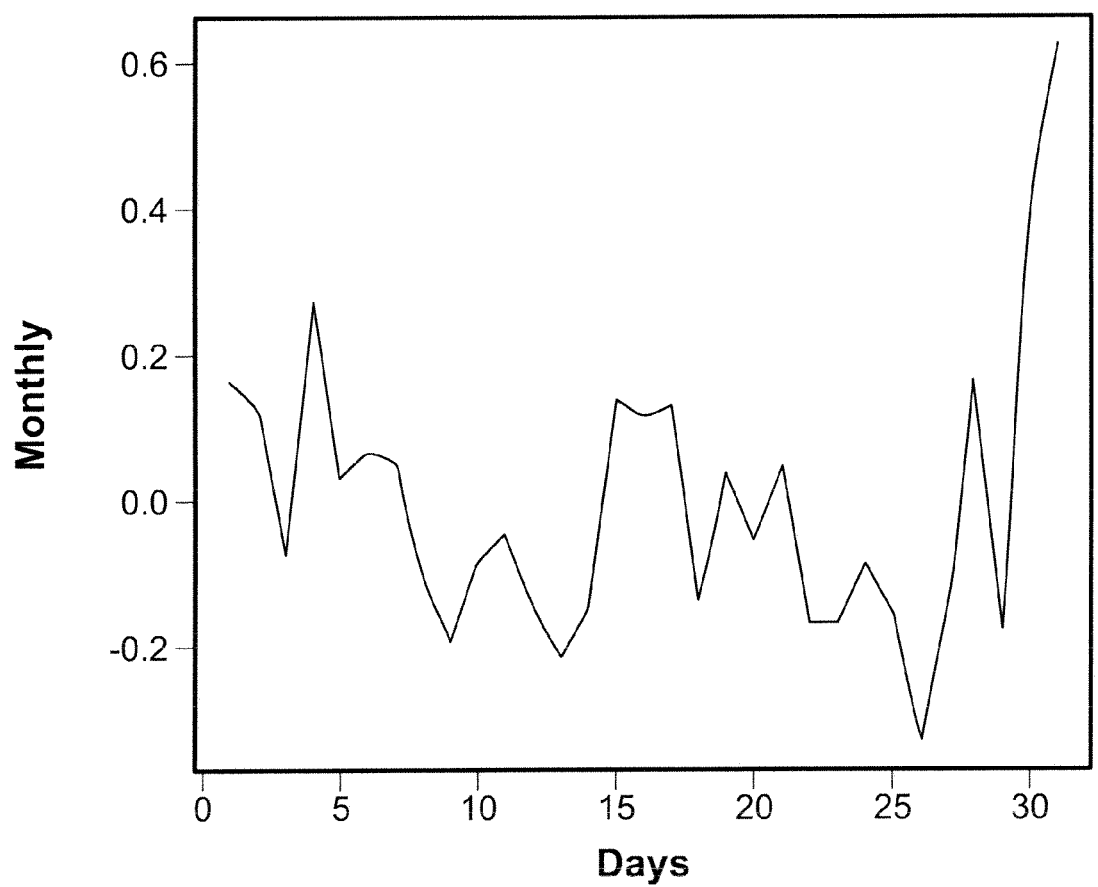
FIGS. 10 and 11 depict monthly and weekly patterns, respectively.
Figure 11:
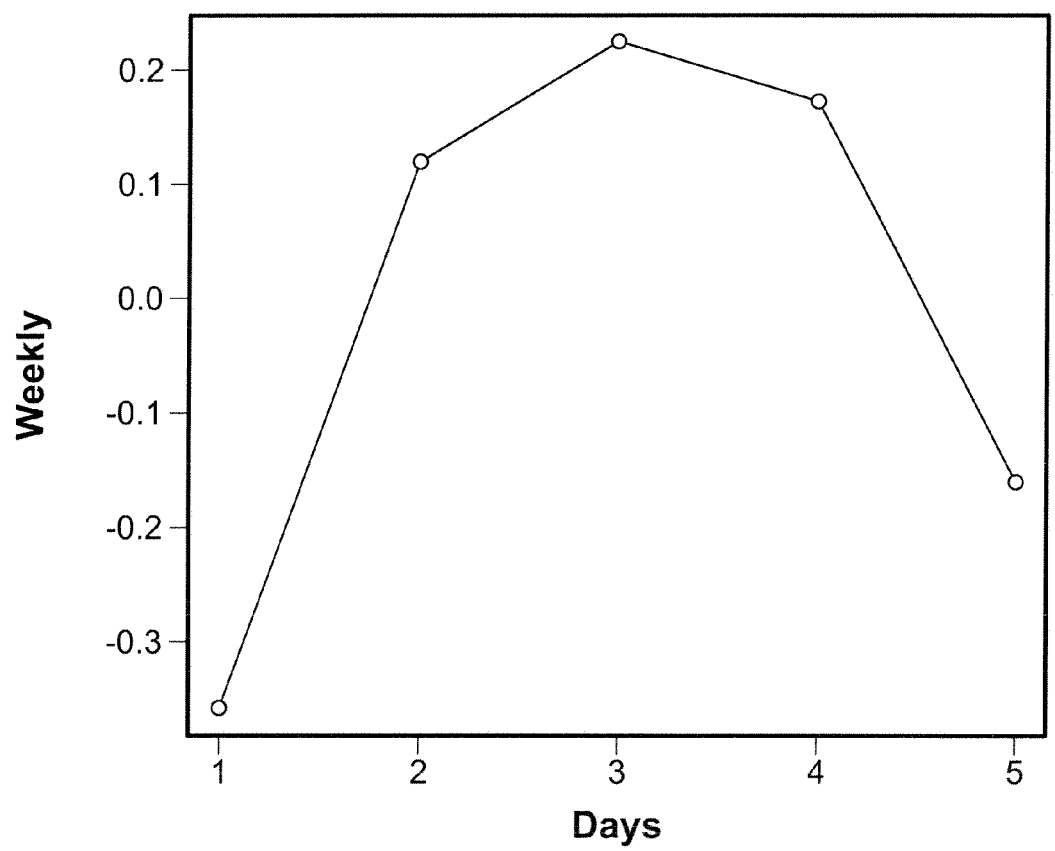

We also found monthly (see FIG. 10) and weekly patterns (see FIG. 11) by finding an average turnover profile over a month and a week, respectively. We removed these two patterns from the time-series to improve stationary nature of the data.

Special Days

We collected various other data about important dates affecting market liquidity. We handle turnover data for these days differently to make sure we remove any spikes in the data due to exceptional circumstances on these days. We replace data for these days with ten day moving averages. We also calculate corrections from this data for such special days so that they can be applied to occurrences in future data to make better predictions. These special days include:

Expiry Fridays: Every month we have option expiry and every 3 months we have futures expiry. For such dates we replace turnover data by 10 day moving averages.

FOMC: These are the dates when the Federal Open Market Committee issues statements after monthly meetings.

MPC: These are the dates when the Monetary Policy Committee issues statements after monthly meetings.

Holidays: Holidays such as Easter, Good Friday, bank holidays, Christmas, Thanksgiving, Labor Day, etc. also show different liquidity patterns. We consider one day before and one day after such holidays as special days as well.

Other special days: These are financial scandals, terrorism and other such past events impacting trading volume in a big way.

Russell rebalancing: For US stocks the Russell rebalance days are very crucial so these are also considered as special days.

Other Corrections

To avoid computational difficulties related to missing data, we substitute 10 day moving average values for the missing holiday values.

For our analysis we have excluded data for the first 3 days and last 9 days of each year due to Christmas and New Year vacation. In this period the liquidity in the market is very low and highly unpredictable.

We do not include data for the first 3 days after new listing for any stock.

Earnings dates: We remove data near earnings dates while calculating market patterns. Near an earnings announcement date we see high volatility in turnover data.

Index addition/deletion: For any stock the turnover data is deleted for dates when it was added or deleted to any index. We saw that on such days turnover is exceptionally high as passive managers rebalance their portfolios.

Model Estimation

After filtering out data with trend, seasonality, and special days effects, we fitted an ARMA (p, q) model on our residual time series. The ARMA model is a combination of the AR (Autoregressive) and MA (Moving Averages) models:

$$V_{t+1} = \alpha_0 V_t + \alpha_1 V_{t-1} + \ldots + \alpha_p V_{t-p} + \beta_0 \epsilon_t + \beta_1 \epsilon_{t-1} + \ldots + \beta_q \epsilon_{t-q}$$

where $V_t$ is the value of the series at time t (turnover series in our case) and $\epsilon_t$ is the error at time t.

ARMA(p,q)Fit

To get the best ARMA fit we tried different values of (p, q) to minimize AIC (Akaike Information Criteria). The best ARMA fit was for (1, 2) for most of the exchanges. For the rest, although we obtained minimum values at some higher values of (p, q), we didn't see much improvement of that model over (1, 2) model. For standardization, we used an ARMA (1, 2) fit for all the stocks across all the exchanges.

Figure 12:
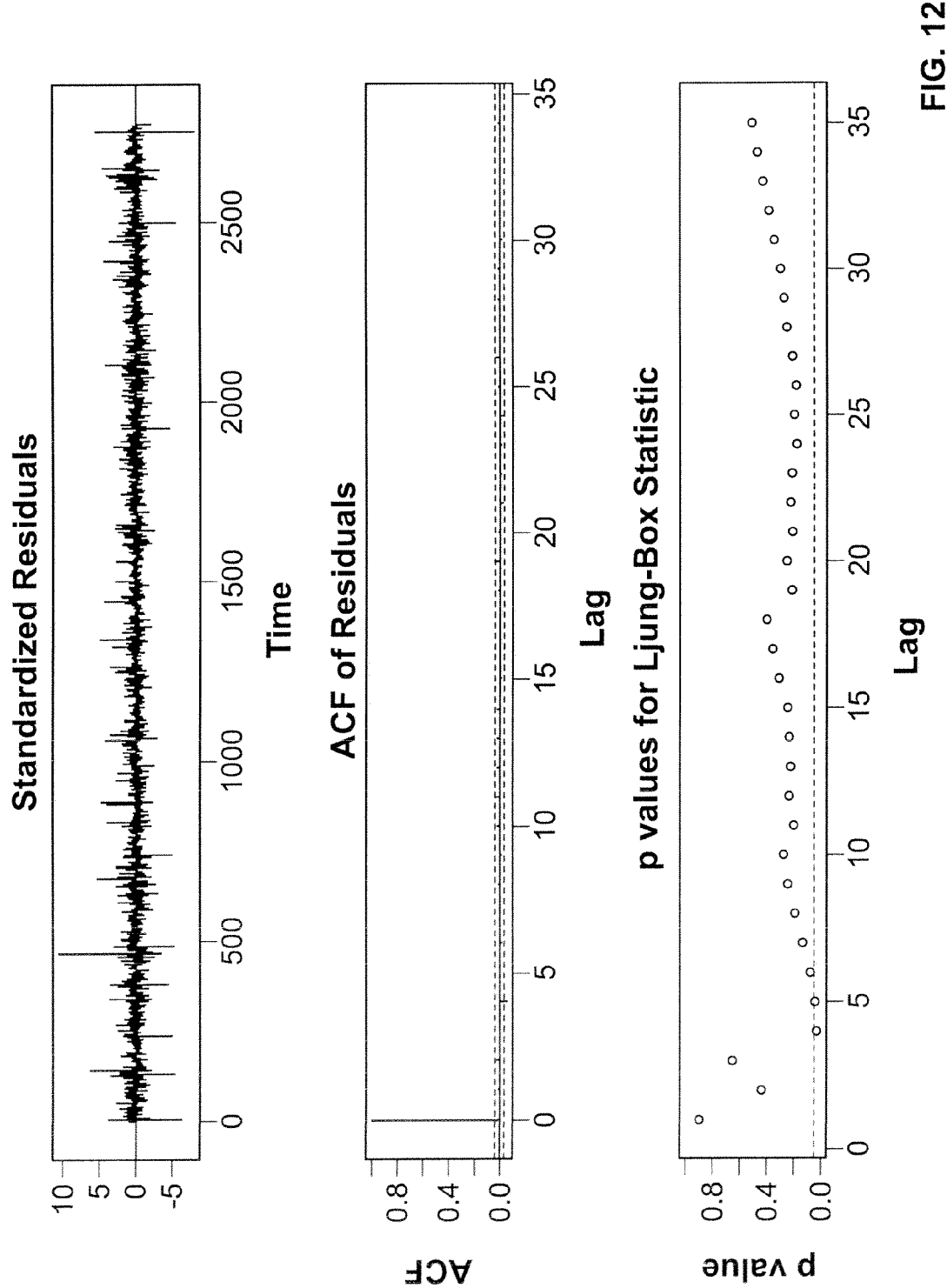
FIG. 12 depicts an autocorrelation plot of residual time series.
Figure 13:
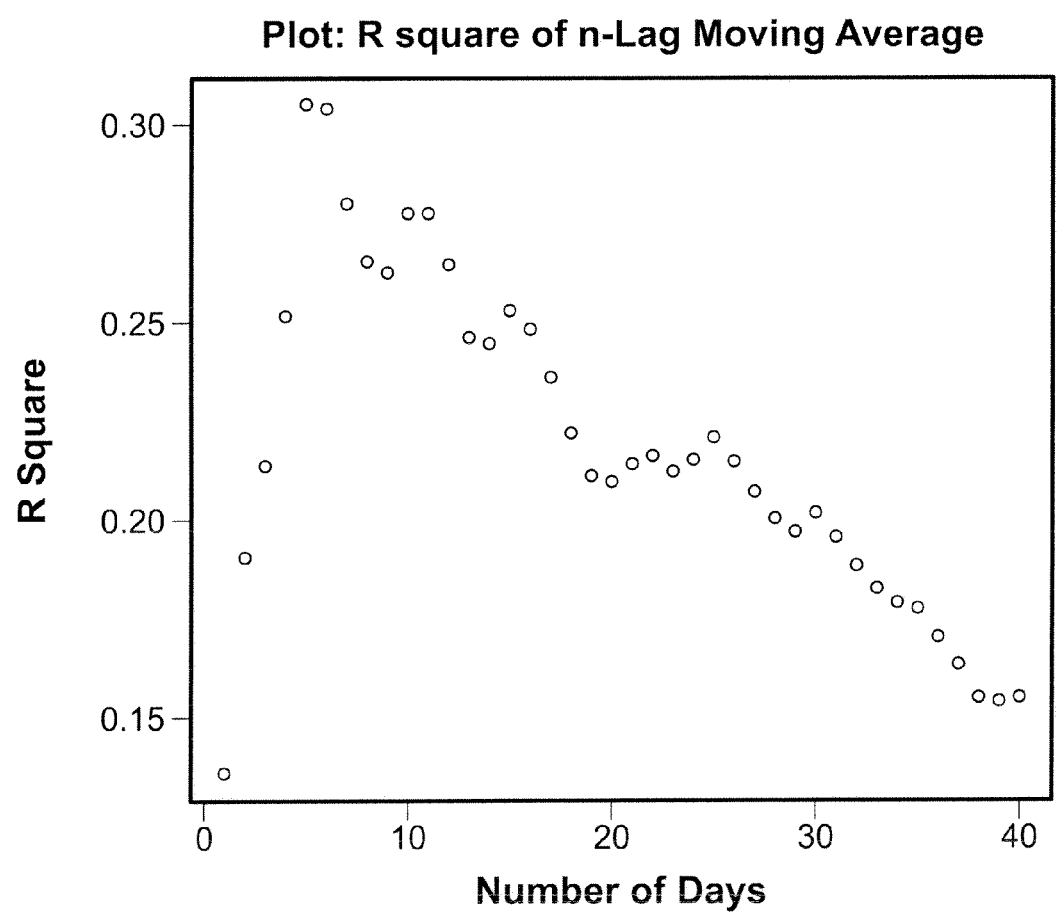
FIG. 13 illustrates changing R-Square at different lags in a moving average method.

The autocorrelation plot (see FIG. 12) of residual time series shows that the residuals are close to white noise. The p-values of the Ljung-Box statistic also show this.

Autoregressive coefficients were found close to 1, suggesting momentum in the turnover series. Moving average coefficients were found to be negative, which means that the turnover series has a mean-reverting component as well.

After getting the best ARMA fit forecast, all the identified patterns are added back sequentially to get an actual estimate. Various ways of implementing the adding back will be known to one skilled in the art.

Results for a Market-Wide Model

To measure the performance of our model, we compared the forecasted volumes obtained by our volume model with simple turnover predictors like N-day moving averages and N-day median.

First, we identified the optimal lag in a moving averages method. We took the original average market profile and computed the R-square value on the number of days in the moving average. The $R^2$ value is defined as: $R^2=1-$variance (error)/variance (actual data).

The number of days that maximizes R-Square is 5, with a value of 31.9%. The same exercise was repeated for moving medians. The value of R square for a 21-Day median is 24.94%. The R-Square value for our ARMA model was 54.95%, clearly demonstrating that our ARMA model is far superior to these other models.

Moreover, the ARMA model itself adds value over the other estimates, based on our analysis of residual time series. We applied ARMA and the other two models to the residual series obtained after market wide corrections explained above. We then calculated the R-square value for each of the models. The R-square values are 28.99% for ARMA, 21.36% for 5-Day Average, and 20.55% for 21-Day Median.

These results show that significant improvement in volume forecasts can be obtained from better handling of market phenomena (special dates, etc.) and ARMA model fitting.

Single Stock Volume Estimation

So far we have described an exemplary implementation of a market wide time-series model and seasonal, long-term patterns in market-level data. We now describe an extension of this process for individual stocks to clean their data and make forecasts. We apply the ARMA model developed above for predicting the volume of single stocks as well. However, before we go about applying the model at the stock level, we must ensure that the single stock turnover series is stationary.

Figure 14:
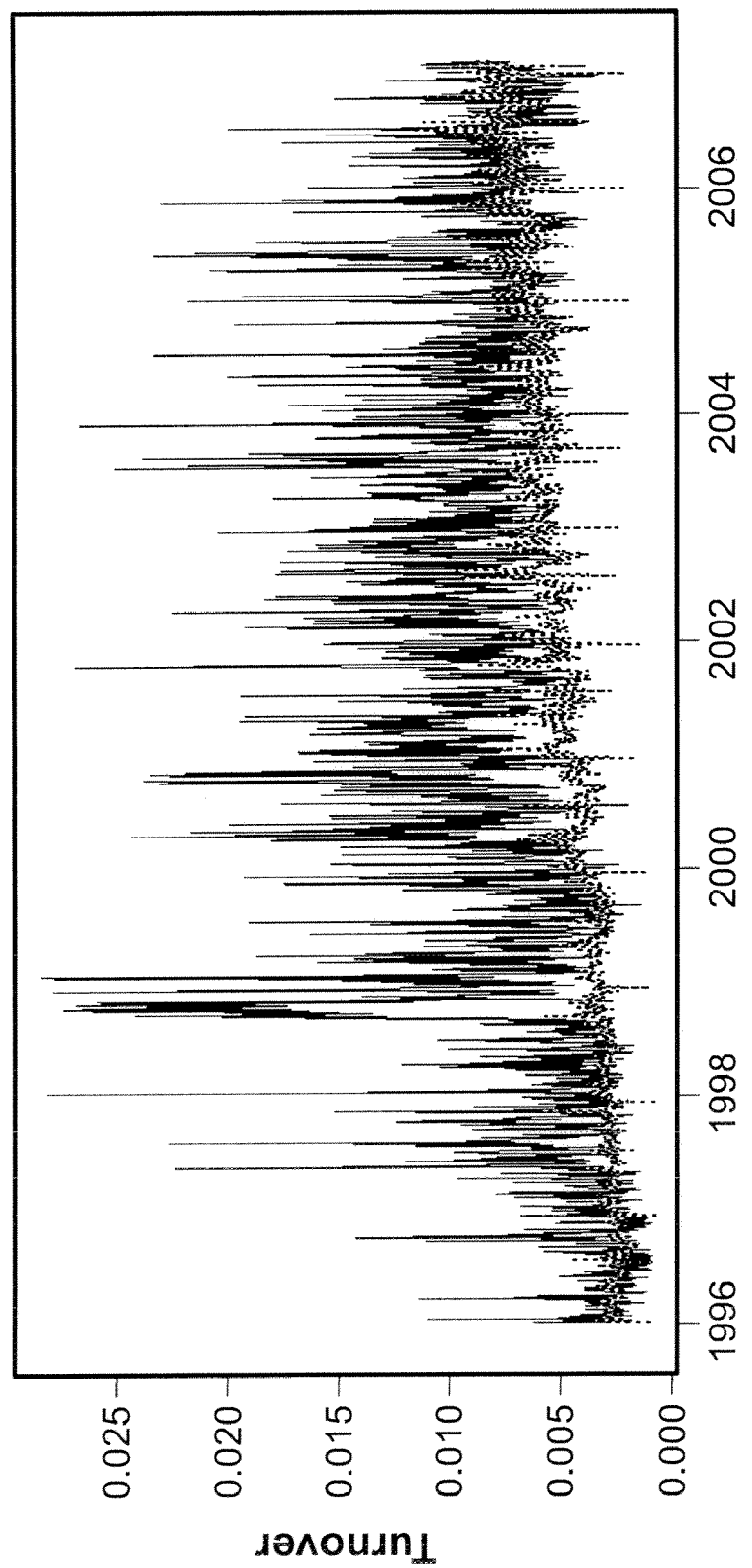
FIG. 14 illustrates turnover for LEH vs. average market turnover.
Figure 15:
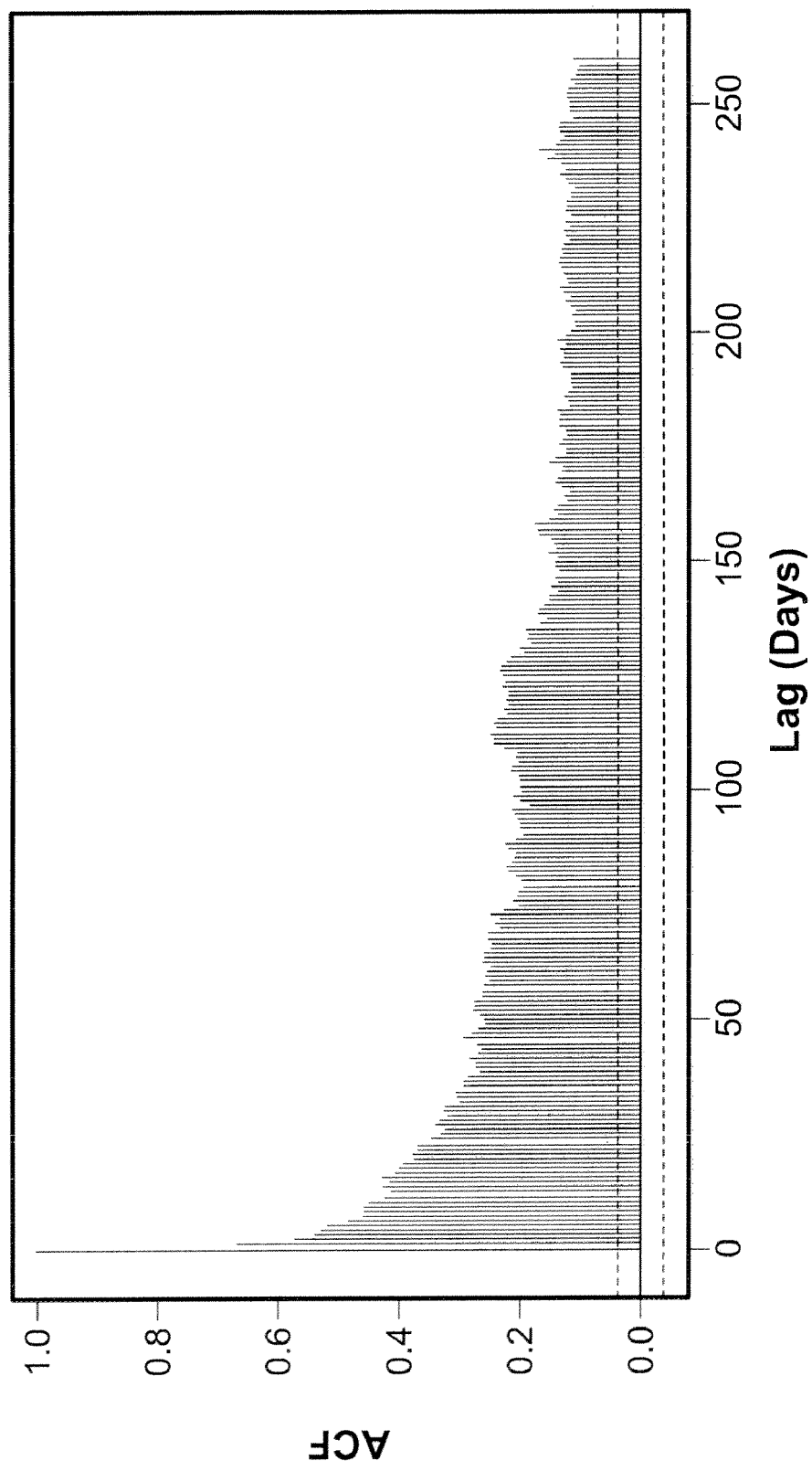
FIG. 15 depicts an autocorrelation plot of turnover time series of a single stock.

Plots of individual stock turnover series (FIG. 14) and autocovariance (FIG. 15) show little systematic structure. This is due to the fact that for an individual stock, idiosyncratic effects are much more significant than seasonal effects. In the case of the total market turnover rate, stock-specific effects were averaged out, and the seasonal effects were much more pronounced.

In order to make the single stock turnover series stationary, we filtered it for different market patterns we had obtained above for average market turnover series. We store market patterns in normalized form so they can be applied to any stock by simply multiplying it with the standard deviation of the turnover of that stock. In an embodiment, we applied the following market level patterns—trend, variability, seasonality (annual, monthly, weekly).

Figure 16:
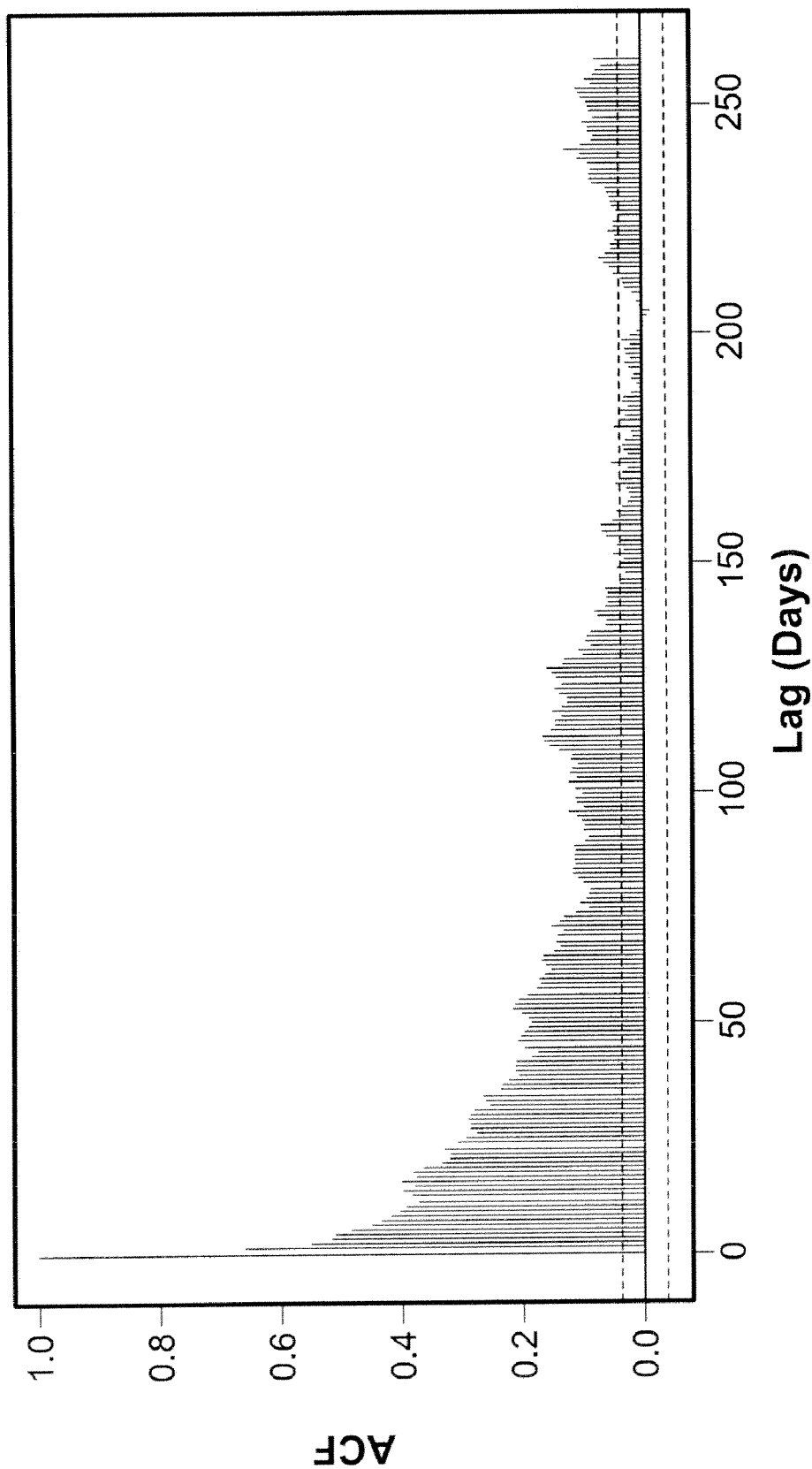
FIG. 16 depicts an autocorrelation plot of a single stock turnover time series corrected for market.

Applicability of the total market seasonal effects to the forecast of the single stock turnover rate is neither easy nor sufficient. This can also be observed in the ACF plot for the single stock turnover series corrected for market patterns (see FIG. 16), where it is shown that ACF values do not decay very quickly as compared to the average market turnover series.

Earnings Announcement Effects

Figure 17:
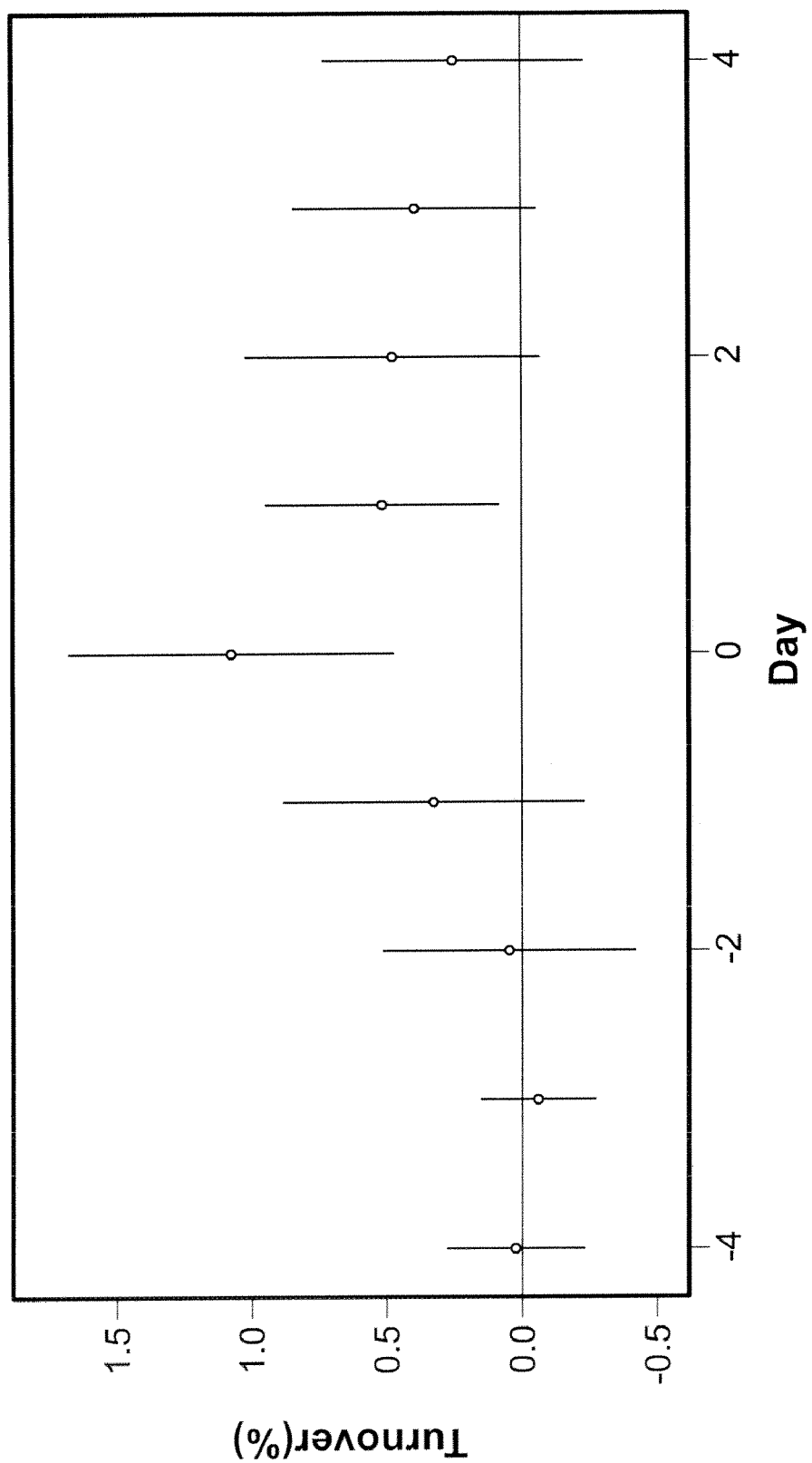
FIG. 17 illustrates turnover rate contribution from earnings announcement events.

To further make the stock level turnover series stationary, we introduce a component due to earnings announcement effects to describe the increase in turnover rates a few days prior to the date of the earnings announcement, the date itself, and a few days after that. In FIG. 17, the earnings component (with error bars) is shown vs. the number of days away from the earnings announcement (day 0 is the day of the announcement; day 4 is 4 days after the announcement). For instance, for one random stock, on average, on the day of the earnings announcement the turnover is roughly 1.0% higher than the average. There is also some enhancement one day prior to the announcement and up to 4 days after the announcement.

Based on this analysis we define dates near earnings and dividend announcement dates as special days. Turnover data for these days is replaced by 10 day moving averages. This helps to remove spikes in the data in order improve forecasts with ARMA model.

Results and Comparisons

After removing the earnings effect mentioned above with respect to the illustrative example, the market model is better suited for individual stocks. The same ARMA (1, 2) model may be fitted to individual stock turnover series.

Figure 18:
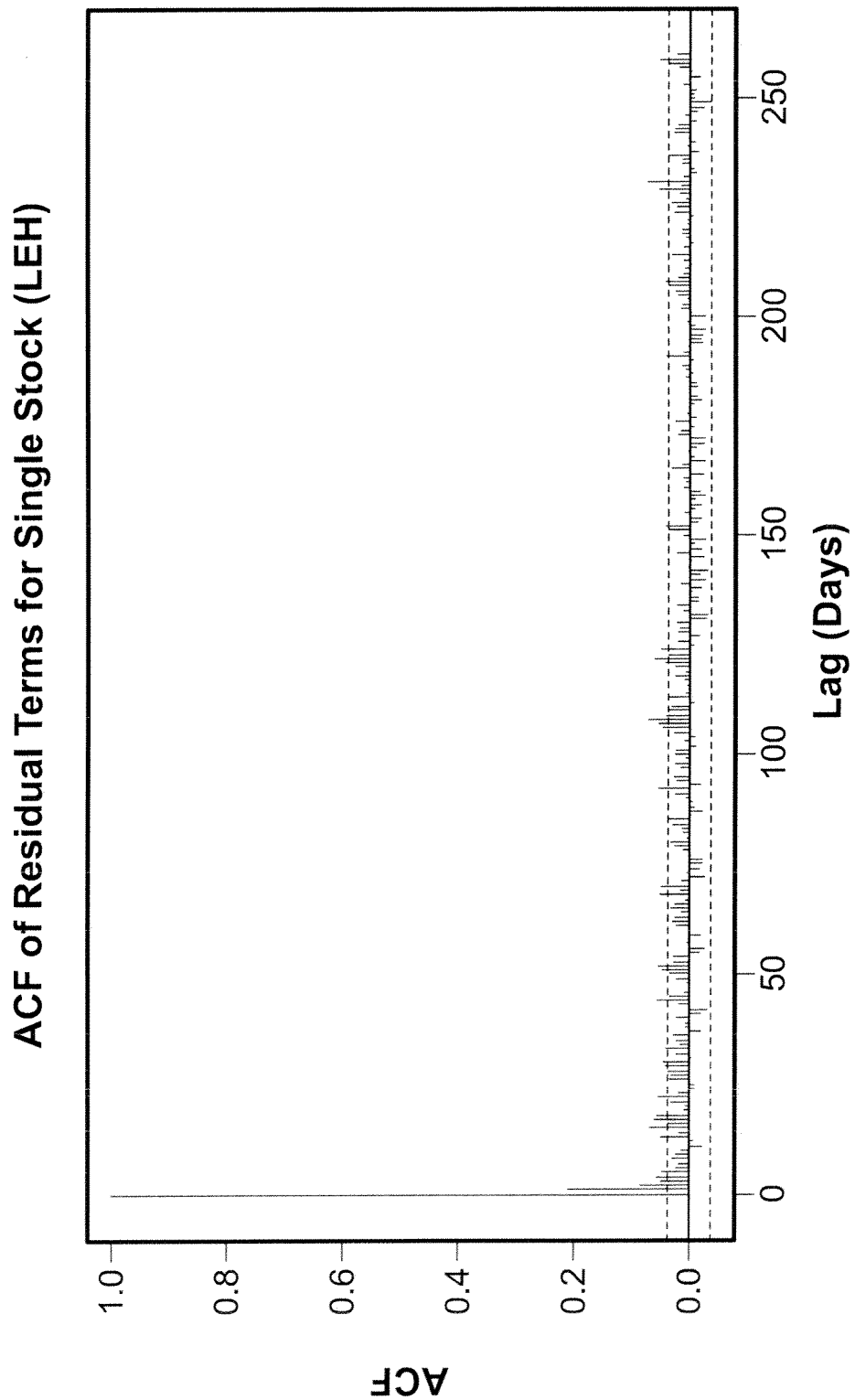
FIG. 18 depicts an autocorrelation plot of a residual series of single stocks.

As expected, the autocorrelation plot of residual time series shows that the residuals are close to white noise. We show the ACF for an exemplary stock in FIG. 18.

To analyze prediction quality, we performed out-of-sample testing. We obtained a predicted data series using our methodology and also the actual data series. From this data, we again calculated the $R^2$ values. We present these results for some of the major exchanges around the world.

Figure 19:
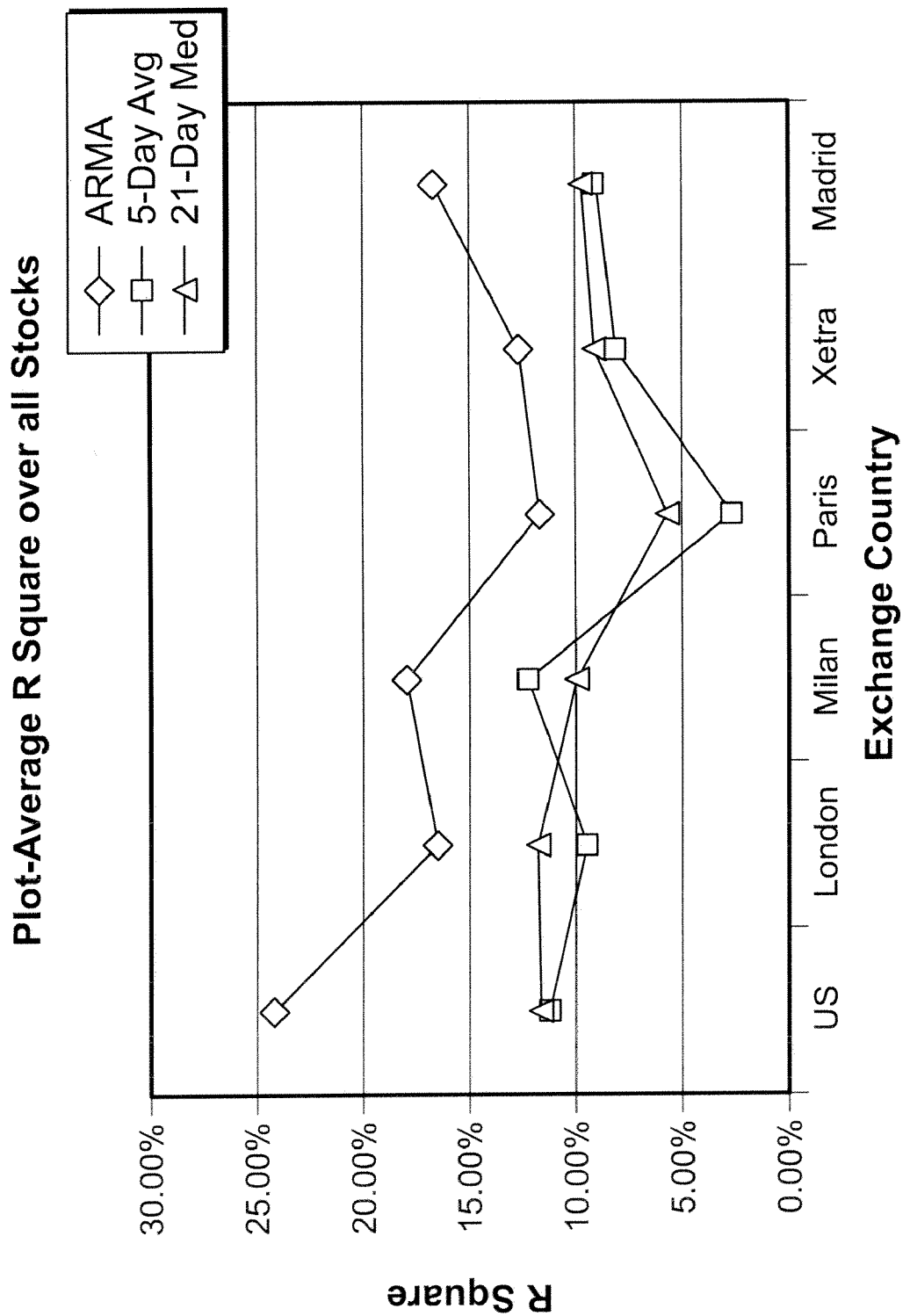
FIG. 19 depicts an R-Square plot (average over all stocks)

We found an average $R^2 \sim 24.17\%$ for US stocks using our full day volume forecasting model (FIG. 19). The same values were calculated for forecasts made by 5-day moving average and 21-day moving median methods. Those methods, in this example, gave the $R^2$ value to be 11.22% and 11.62%.

Figure 20:
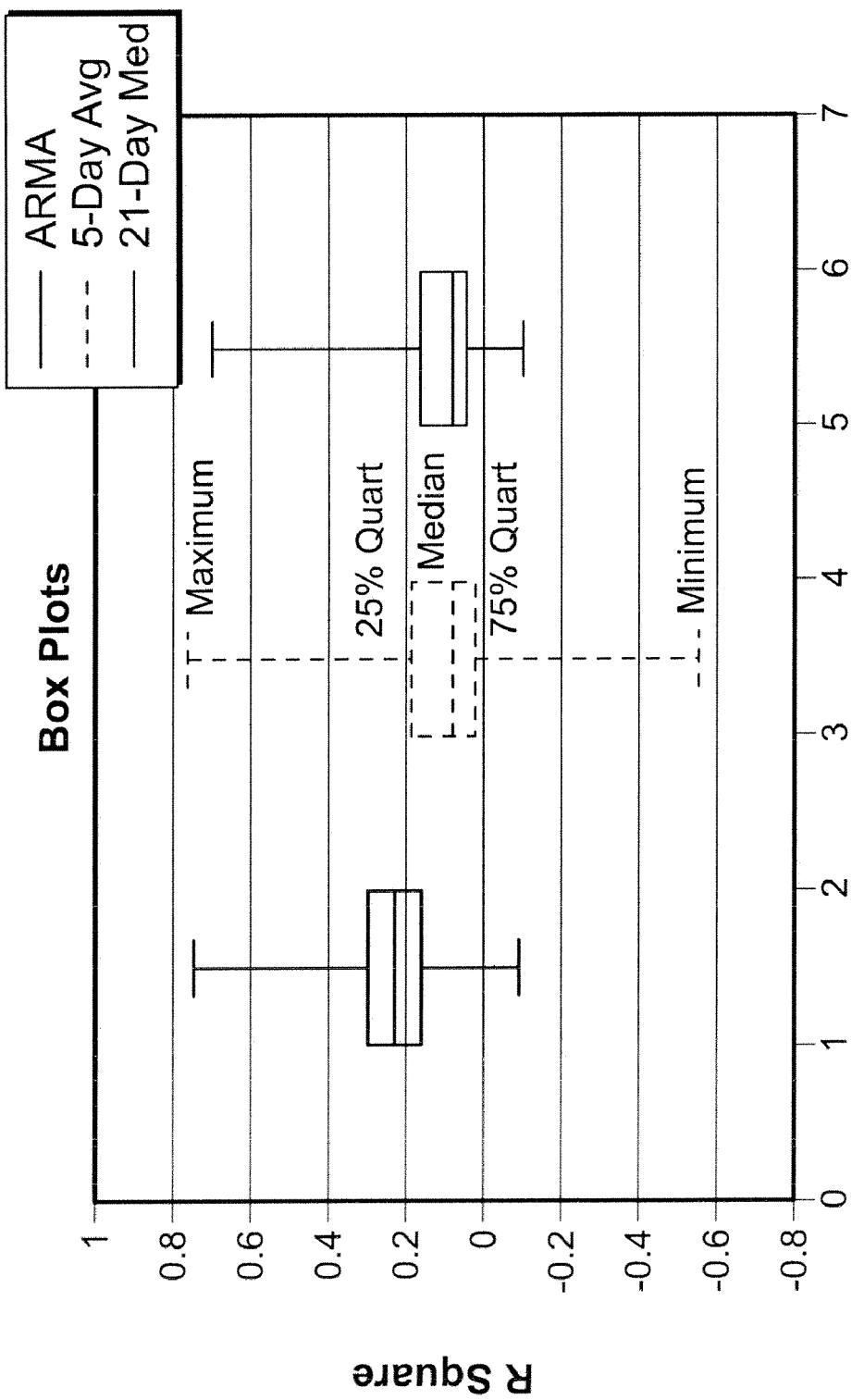
FIG. 20 depicts box plots for R-Square summary statistics (for U.S. stocks)

We also identified quartiles of R-square values for all US stocks (see FIG. 20). They also clearly demonstrate the superiority of the ARMA forecasts used in an embodiment over the other two models.

Similar statistics for other exchanges can be seen in detail in Table 1.

TABLE 1

| | R-Square | ARMA | 5-Day Avg | 21-Day Med |
|---|---|---|---|---|
| U.S. | First Quartile | 16.13% | 1.61% | 3.53% |
| | Second Quartile | 22.17% | 7.53% | 7.92% |
| | Third Quartile | 29.96% | 17.40% | 15.22% |
| London | First Quartile | 5.85% | −3.17% | 2.71% |
| | Second Quartile | 14.79% | 7.77% | 8.94% |
| | Third Quartile | 26.43% | 19.97% | 18.32% |
| Milan | First Quartile | 11.41% | 1.48% | 2.90% |
| | Second Quartile | 19.54% | 11.31% | 7.49% |
| | Third Quartile | 28.44% | 21.16% | 13.23% |
| Paris | First Quartile | 5.33% | −5.60% | 1.17% |
| | Second Quartile | 10.94% | 0.70% | 3.79% |
| | Third Quartile | 15.81% | 8.61% | 9.28% |
| Xetra | First Quartile | 4.92% | −1.49% | 1.41% |
| | Second Quartile | 10.19% | 6.71% | 6.24% |
| | Third Quartile | 18.81% | 17.18% | 14.94% |
| Madrid | First Quartile | 6.80% | −4.74% | 1.69% |
| | Second Quartile | 15.28% | 8.30% | 6.62% |
| | Third Quartile | 24.24% | 21.56% | 15.00% |

Figure 21:
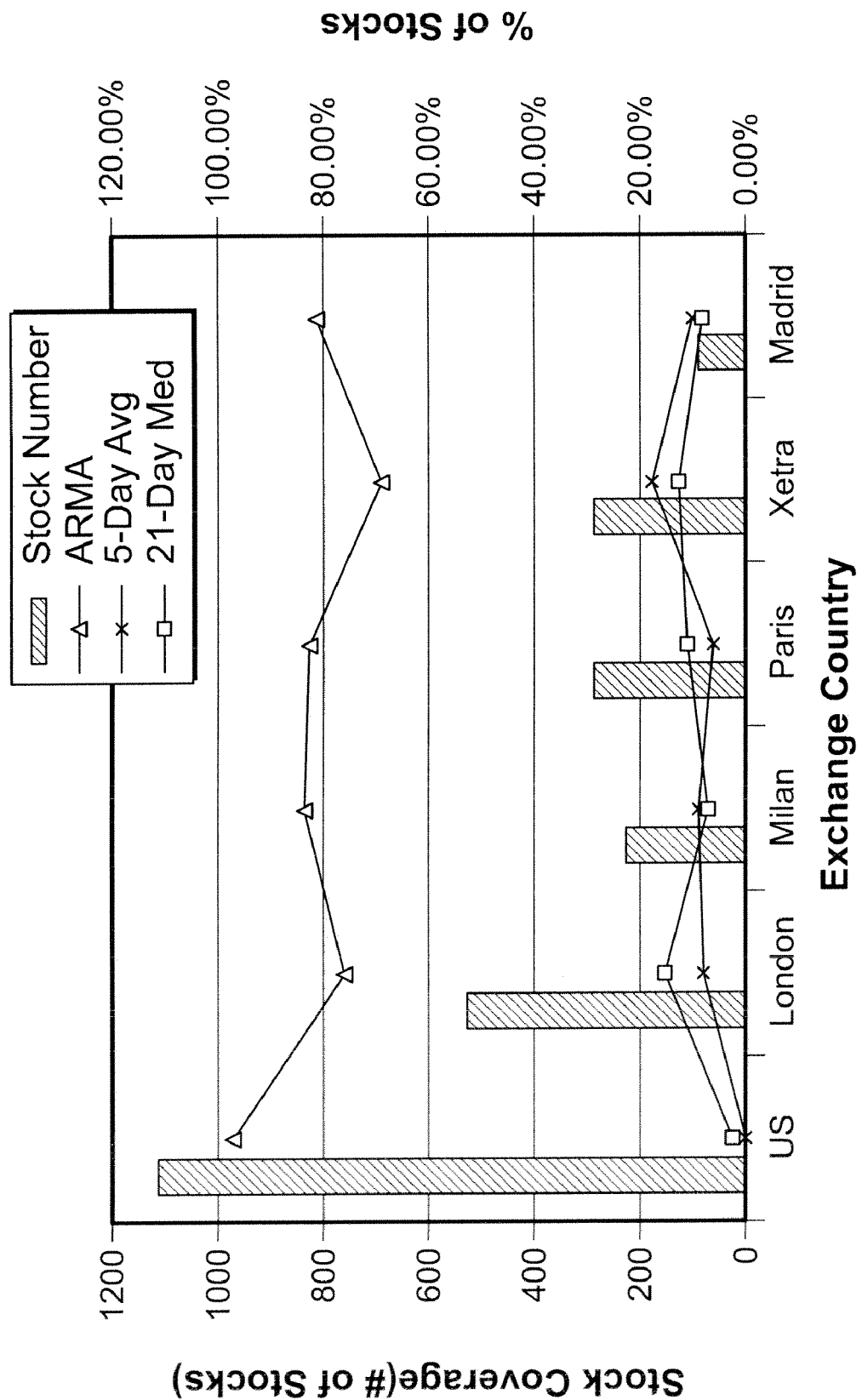
FIG. 21 depicts a composition of stocks showing improvement.

In FIG. 21, the column corresponding to the U.S. shows that for 96.84% of the total stocks covered (1107—plotted on the left Y axis), the exemplary ARMA forecast performs significantly better than the other forecasts. The percentage of stocks for which 5D Avg and 21-D Med is performing better than our volume model are just 0.45% and 2.71%, respectively.

In order to check any strong bias in our model towards capitalization, we divided the U.S. stocks on the basis of market capitalization.

Stocks with marketCap>5b USD were categorized as large cap.

Stocks with 5b USD>marketCap>1b USD were categorized as mid cap.

Stocks with marketCap<1b USD were categorized as small cap.

The results show that the percentages of stocks for which the exemplary model forecast turns out to be the best predictor is 96.35% for large cap stocks, 96.99% for mid cap stocks, and 97.62.% for small cap stocks.

TABLE 2

| | R Square | | |
|---|---|---|---|
| | ARMA Model | 5 Day Avg | 21 Day Med |
| Large Cap | 26.73% | 13.23% | 12.31% |
| Mid Cap | 22.24% | 9.75% | 11.06% |
| Small Cap | 23.30% | 9.80% | 12.13% |

The $R^2$ value for the large-cap stocks is slightly better than the other two categories for all three predictors. This result is consistent with our overall findings—i.e., the value of the ARMA model $R^2$ again is superior to that of the other models.

CONCLUSION

Based on the results above, the volume forecasts described herein are superior to other approaches such as 5-day average and 21-day median. The results are particularly better for the U.S. markets, where the $R^2$ value for the ARMA model is approximately twice the $R^2$ value obtained for 5-Day Avg and 21-Day Median. The model used in the exemplary embodiment accounts for seasonal patterns, long-term patterns, and stock specific events. The methodology, in an embodiment, also relies on an ARMA model instead of simple moving averages or medians to account for momentum and mean reversion effects in the volume. In conclusion, the daily volume prediction model described herein can help improve trading analytics by providing better forecasts.

Another aspect of the disclosed technology is referred to herein as "Intraday Volume Estimation." An Intraday Volume Decomposition Model provides dynamic estimations for trading volume. The following description of Intraday Volume Estimation is organized as follows. First, the methodology used to construct this model is described and compared to classical approaches. Then, the technical specifications of the model are described in more depth. Lastly, the model's performance is analyzed across several exchanges.

Generally, intraday volume follows a U-shaped pattern. That is, the number of shares traded is generally higher near the open and the close, with a relative reprieve in the middle of the day. Thus, the volume time series is characterized by a significant daily seasonality phenomenon. That is why a common and widespread classical approach is to estimate the trading volume as a mean of the several previous days' volumes at the same moment of the day.

In one embodiment, Intraday Volume Estimation generates single stock predictions for the number of shares that will be traded in some particular time period, e.g., some 15 minute period. An estimation of trading volume for each time period in a day, e.g., all 15 minute periods in a day, will be referred to herein as a "volume profile." For ease of explanation, each time period will be referred to as a "time bin" and the length of each time period will be referred to as "bin size." The disclosed technology contemplates using different bin sizes in different scenarios. For example, we can choose 15 minutes as a bin size to aggregate trading volumes for each stock. In this case, each day/volume profile represents a set of 35 time bins (for Europe with most stocks trading from 8:00 to 16:30 with the closing auction in the last time bin) or 27 time bins (in the US) in the volume time series. In various embodiments, volume profile estimations can use different type of metrics, such as number of shares traded, fraction of the day's volume, or fraction of the Average Daily Volume. For ease of explanation, intraday volume estimations will be measured using number of shares traded, although the disclosed technology applies to other metrics as well. In one embodiment of the disclosed technology, the Intraday Decomposition Model separates the stock volume into two parts: a market component that reflects changes due to the entire market evolution, which is extracted from the behaviour of a large universe of stocks; and a specific component that describes the single stock's moves around the market pattern. The idea behind this decomposition is to discriminate between what is static and common to all the stocks in the market (seasonalities/seasonal patterns) and what is related to the specific dynamic of the individual stock's intraday volume (residual data).

In order to extract a common component to all the stocks of the market, we first form an understanding of the variance structure of the data. We begin by conducting a principal component analysis on a matrix $X^j$ that contains, for all the selected stocks, the volume time series on day j. To ease notations, we will from this point on omit the reference to the day j. If T is the total number of 15-minute time bins in a day (typically T=35 or 27) and I is the number of stocks in the selected universe, then for all t in 1, . . . , T, and i in 1, . . . , I, the value $(X)_{ti}$ is the number of shares of the stock i traded in the time bin t.

$$X = \begin{pmatrix} X_{11} & \cdots & X_{1I} \\ \vdots & \ddots & \vdots \\ X_{T1} & \cdots & X_{TI} \end{pmatrix} \begin{matrix} \text{Stocks:} i = 1\ldots I \\ \text{Time bin} \\ t = 1, \ldots, T = 35 \end{matrix}$$

For convenience, we will refer to the columns of X as $X^1, \ldots, X^I$ and the rows of X as $X_1, \ldots, X_T$. The trading volume takes disparate values from one stock to another. Hence our first step is to normalise the columns $X^1, \ldots, X^I$.

$$\text{Let } \overline{X}^i = \frac{1}{T}\sum_{t=1}^{T} X_{ti} \text{ and } \sigma_i^2 = \frac{1}{T-1}\sum_{t=1}^{T} (X_{ti} - \overline{X}^i)^2.$$

The normalised representation of the shares of each stock i traded in a particular time bin t is given by the vector $\tilde{X}_{t1}, \ldots, \tilde{X}_{tI}$, where for all i in $\{1, \ldots, I\}$ $$\tilde{X}_{ti} = \frac{(X_{ti} - \overline{X}^i)}{\sigma_i}.$$

We then consider the correlation matrix $\Gamma$ of $\tilde{X}$. Let $e_1, \ldots e_I$ be its eigenvectors, associated to the eigenvalues $\lambda_1, \ldots, \lambda_I$. We call $S_1, \ldots, S_I$ the I principal components of $\Gamma$. For all i in $\{1, \ldots, I\} = S_i \tilde{X} e_i$.

Figure 22:
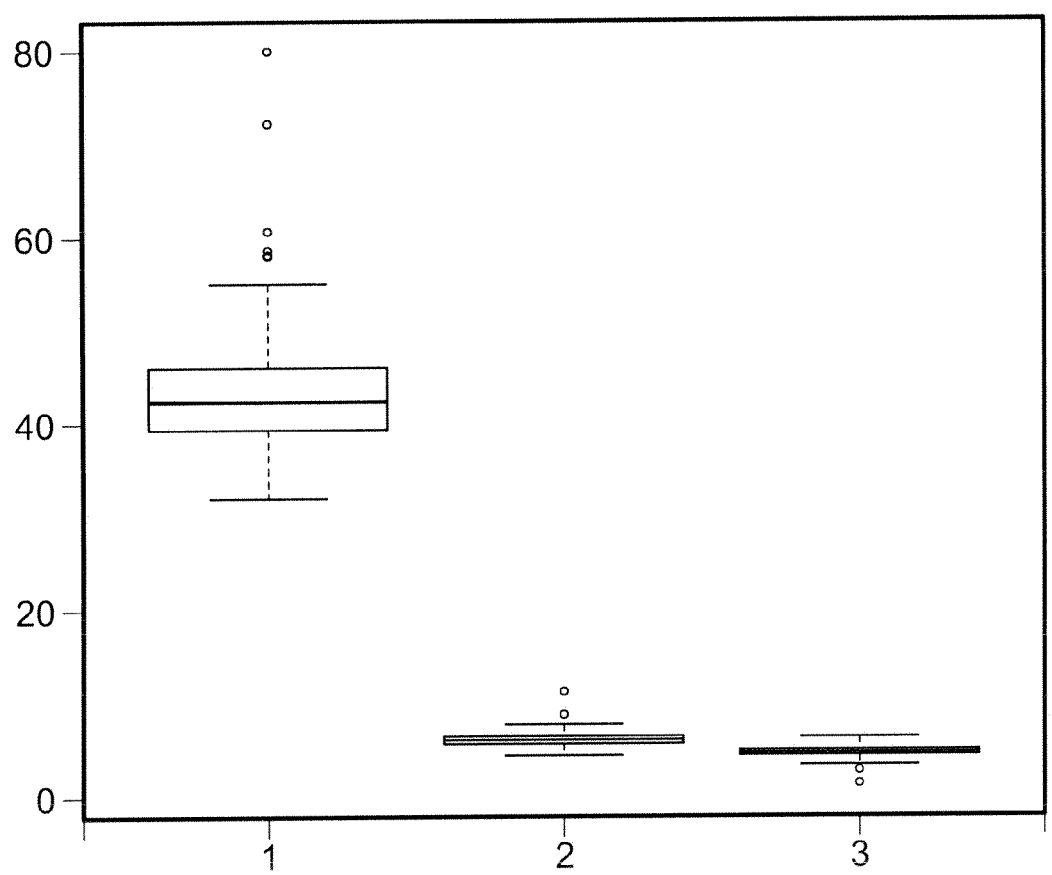
FIG. 22 depicts the correlation matrix Γ's first 3 eigenvalues across days.

As shown in FIG. 22, the distribution of $\Gamma$'s eigenvalues highlights the predominance of the first eigenvector when explaining the variance of the points cloud $\tilde{X}_1, \ldots, \tilde{X}_T$ (rows of $\tilde{X}$). Accordingly, in one embodiment, a projection of $\tilde{X}$'s rows on the first eigenvector $e_1$ is used to identify the part of the trading volume that is common to all the stocks of the market. We write each line of $\tilde{X}$ as the sum of its projections on $\Gamma$'s eigenvectors:

$$\tilde{X}_t = \sum_{p=1}^{l} <\tilde{X}_t, e_p> e_p = \sum_{p=1}^{l} S_p^t e_p$$

$$\text{Hence } \tilde{X}_{ti} = \frac{X_{ti} - \overline{X}^i}{\sigma_i} = \sum_{p=1}^{l} S_p^t e_p^i$$

$$\text{Since } Cov(S_p, X^i) = \sigma_i Cov(S_p, \tilde{X}^i) = \sigma_i \sum_{j=1}^{l} Cov(\tilde{X}^j, \tilde{X}^i) e_p^j$$

$$= \sigma_i \sum_{j=1}^{l} \Gamma_{ij} e_p^j = \sigma_i \lambda_p e_p^i$$

We have:

$$X_i = \overline{X}^i + \sum_{p=1}^{l} \frac{Cov(S_p, X^i)}{\lambda_p} S_p^t$$

We are then ready to decompose each time bin for each stock into its two components—a market component $V_{ti}$ that reflects changes due to the entire market evolution, and a specific component $Y_{ti}$ that describes the single stock's moves around the market/seasonal pattern:

$$X_{ti} = V_{ti} + Y_{ti}$$

where $$V_{ti} = \overline{X}^i = \frac{Cov(S_1, X^i)}{\lambda_1} S_1^t \text{ and } Y_{ti} \sum_{p=2}^{l} \frac{Cov(S_p, X^i)}{\lambda_p} S_p^t$$

Figure 23:
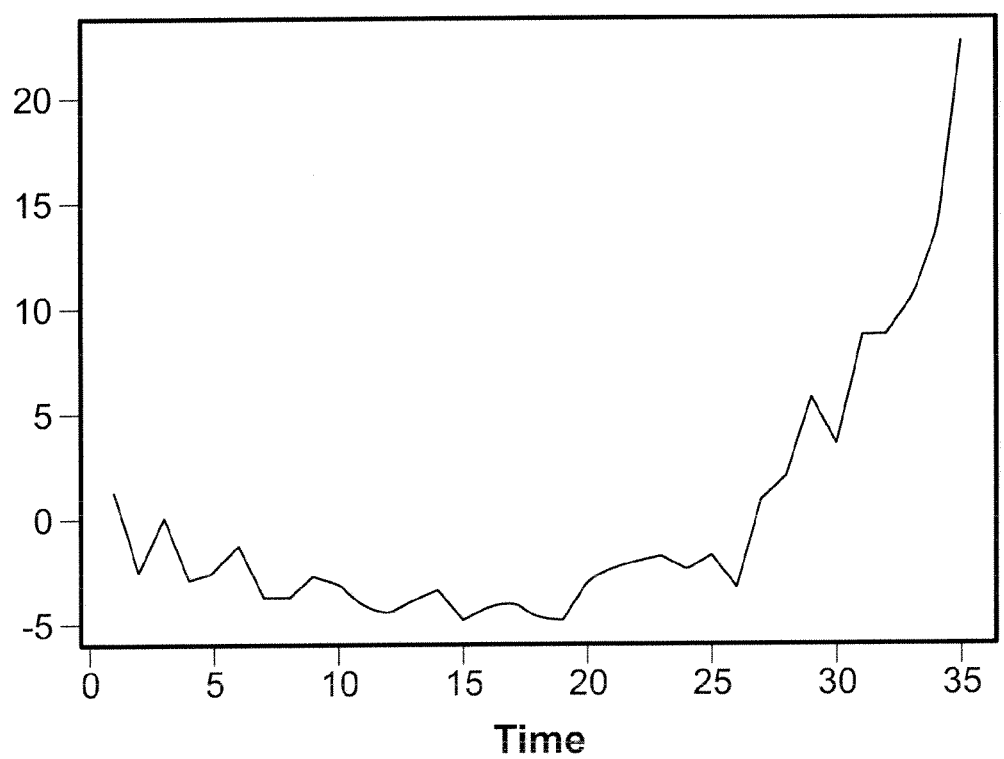
FIG. 23 illustrates exemplary values for the first principle component $S_1$ of the correlation matrix Γ.
Figure 24:
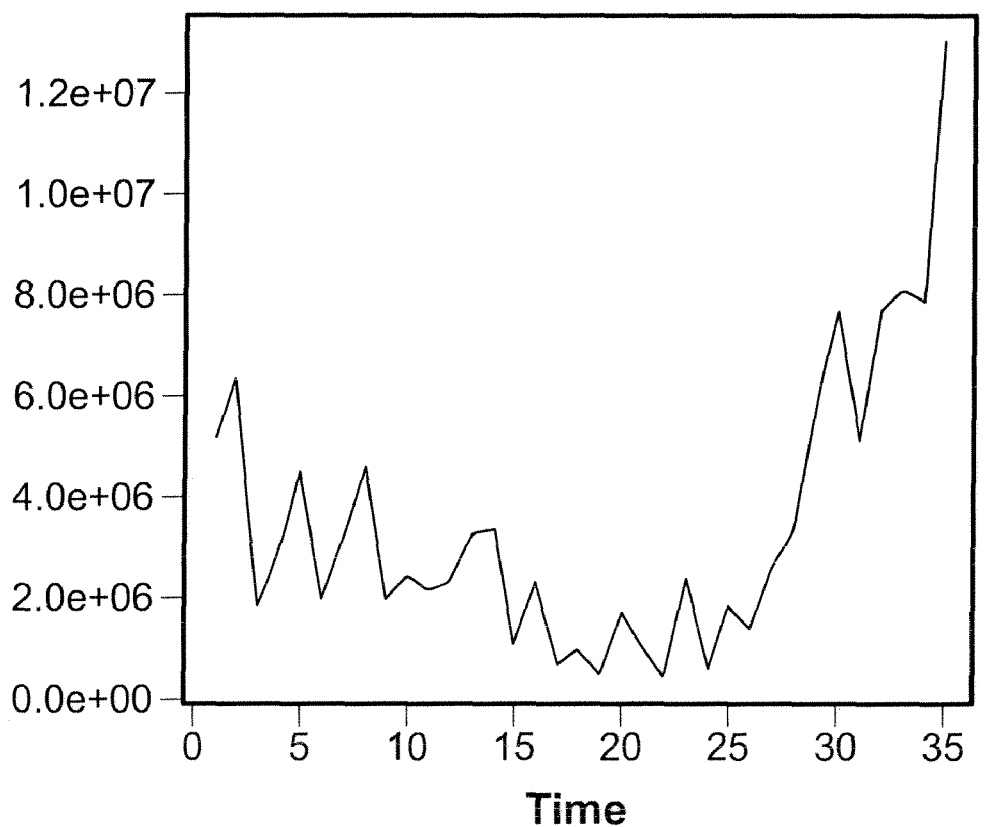
FIG. 24 depicts intraday trading volume for Vodafone™ stock.
Figure 25:
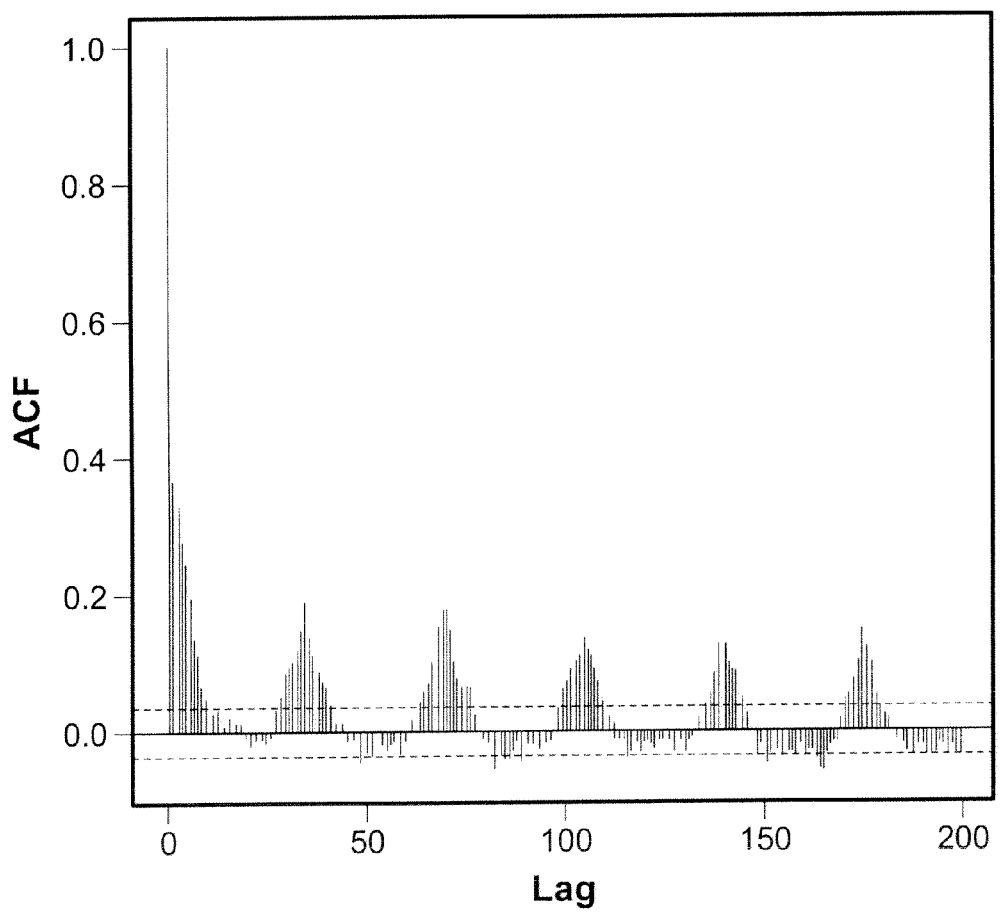
FIG. 25 illustrates autocorrelation values for matrix X, which contains the trading volume on a particular day for selected stocks.

The matrix V is obtained by projecting the rows of $\tilde{X}$ on the first eigenvector of its correlation matrix, and contains all the cyclical/seasonal patterns of the intraday volume. Y=X−V removes that market level effects and reflects the stock's specific moves around that market component. The resulting data Y is also referred to herein as "residual data." An example of the values of the first principle component $S_1$ is shown in FIG. 23.

Figure 26:
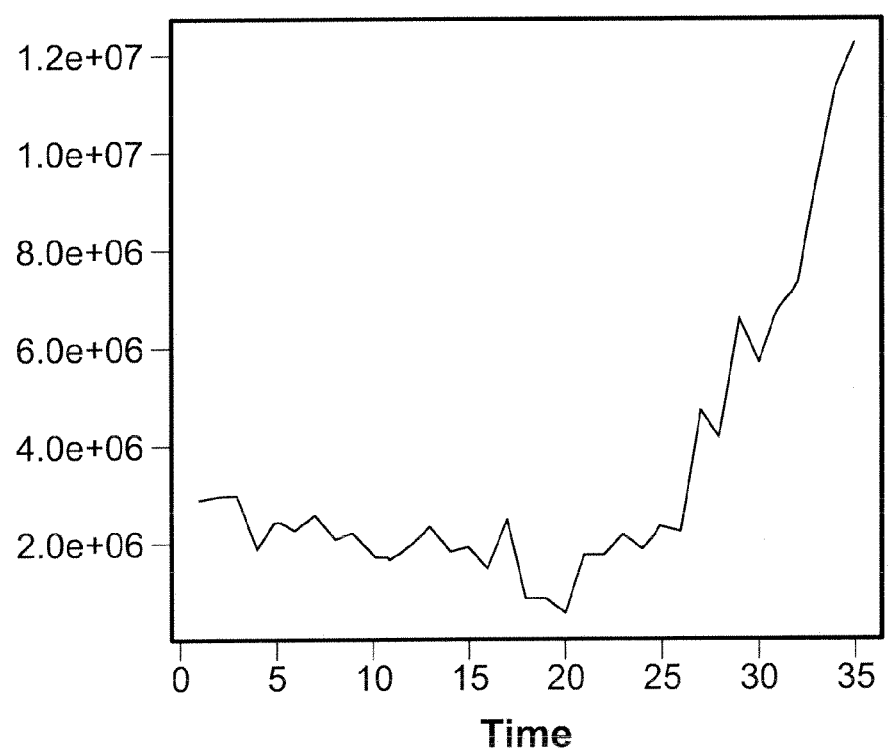
FIG. 26 illustrates values for the market component V of the Vodafone™ trading volume shown in FIG. 24.
Figure 27:
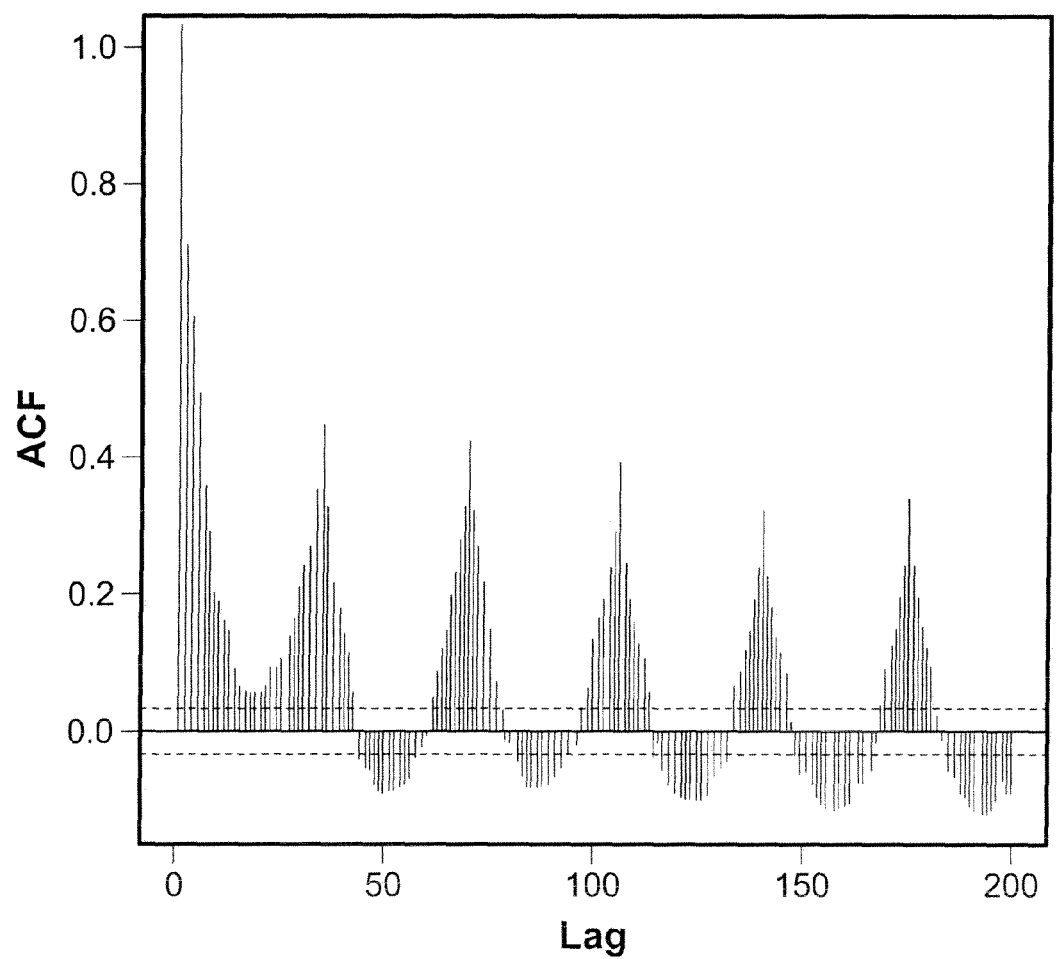
FIG. 27 illustrates autocorrelation values for the market component V shown in FIG. 26.
Figure 28:
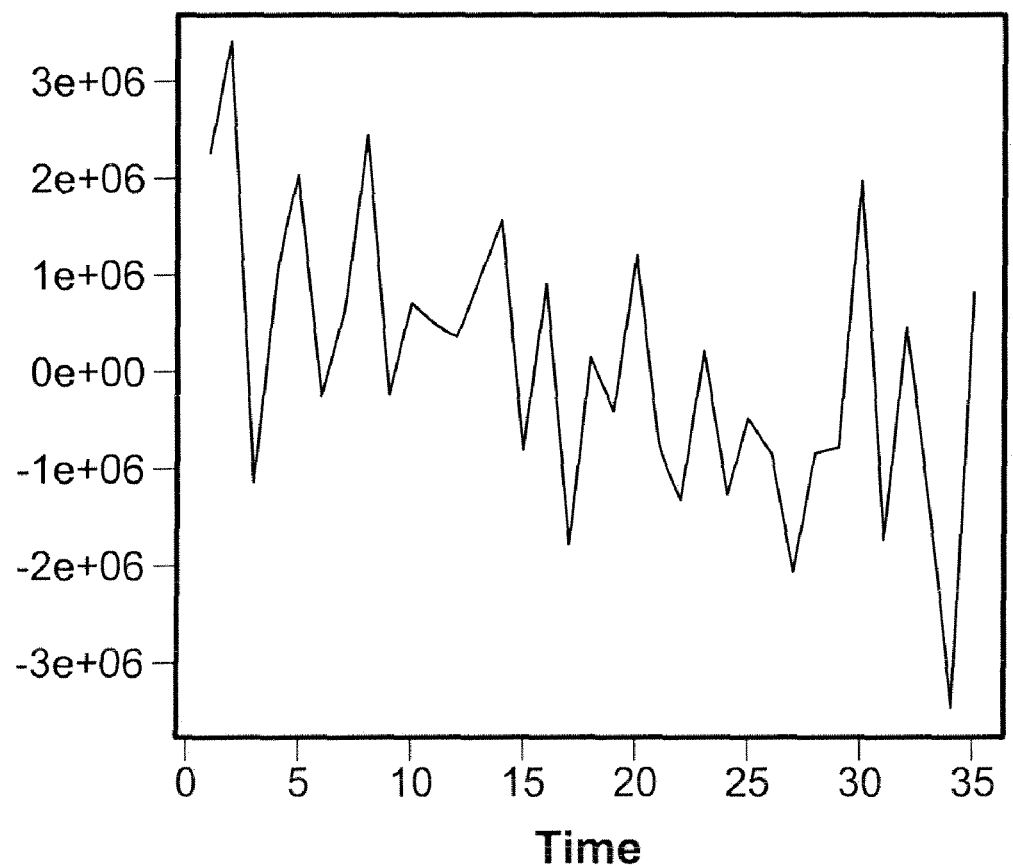
FIG. 28 illustrates values for the specific component Y of the Voldafone™ trading volume shown in FIG. 24.

FIGS. 24-29 illustrate the computations above for decomposing the market component and specific component and uses intraday trading volume information for Vodafone™ stock (FIG. 24) as an exemplary baseline. Values for the matrix X (which includes trading volume for a particular day for selected stocks) were computed but are not illustrated. Values for the market component V are shown in FIG. 26. Using autocorrelation, we can see in FIGS. 25 and 27 the daily seasonality pattern in X and in the market component V. The seasonality spikes are higher in V because it is more stable than X from one day to another. FIG. 28 shows values for the stock-specific component Y. Using autocorrelation, we can see in FIG. 29 that there is no seasonal pattern in the stock-specific part Y.

What has been described thus far is the method of decomposing/computing the market component and the stock-specific component of a particular stock's intraday trading volume when we have a matrix X of intraday trading volume for a selection of stocks. To apply this methodology to predicting intraday trading volume, we note that at any particular point in time in the current day, we will not have the matrix values of X for the rest of the day. However, as we observed in FIGS. 25 and 27 and noted above, the market component $V_{ti}$ is much more stable than the volume time series X. As a consequence, in one embodiment, we can fill in the missing values of $V_{ti}$ in our equation by $\overline{V}_{ti}$, a median of the values of $V_{ti}$ for the 10 previous days.

Thus, our model for estimating intraday trading volume is:

$$X_{ti} = \overline{V}_{ti} + Y_{ti},$$

(for which we still need to find missing values of $Y_{ti}$ for the rest of the current day). It is noted that the particular choice of $\overline{V}_{ti}$ here is exemplary. The disclosed technology is not limited to filling in the missing values of $V_{ti}$ using median values for the 10 previous days. Other ways of filling in the missing values of $V_{ti}$ are contemplated, including, for example, using other variations of earlier market level effects for the same security and for the same or a different time bin.

Modelling $Y_t$

Figure 29:
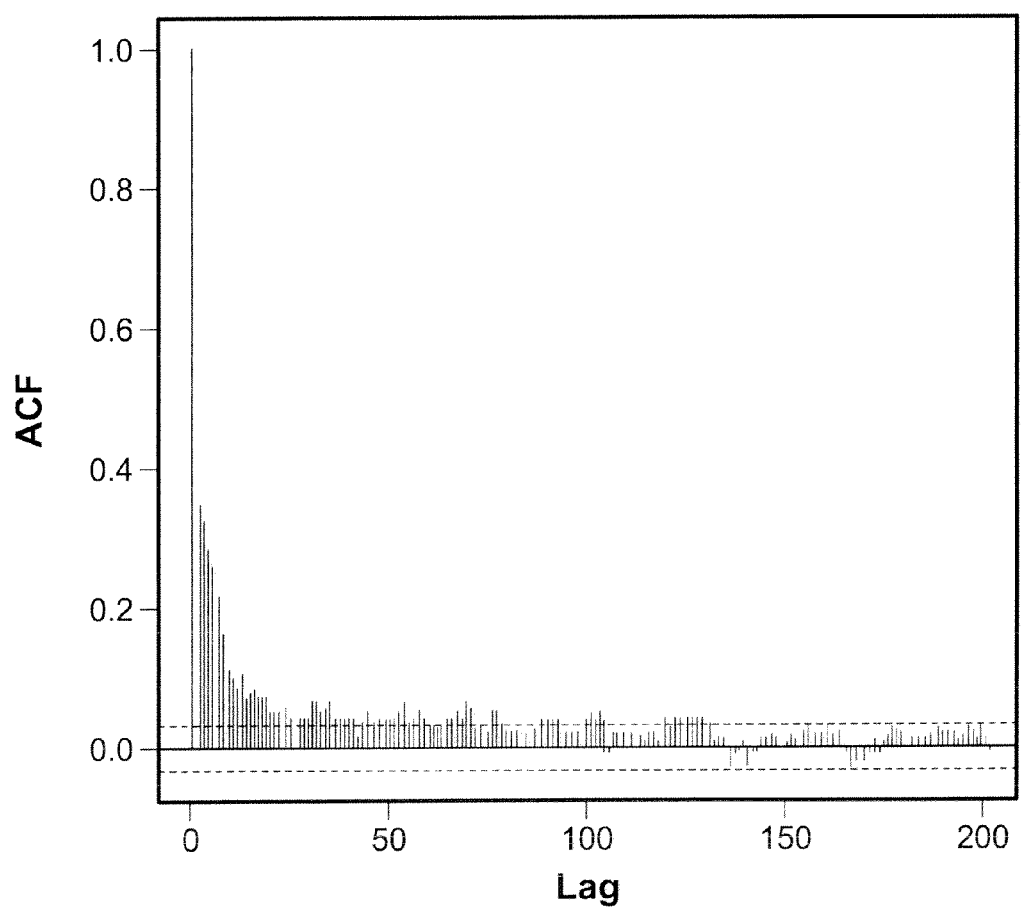
FIG. 29 illustrates autocorrelation values for the specific component Y shown in FIG. 28.

We now turn to modelling values of Y for the rest of the current day. Before applying a time series model to $Y_t$, we test its stationarity properties. As shown in FIGS. 28-29, a graphical examination shows that there is no trend component in $Y_t$. We test the stochastic stationarity through the Augmented Dickey Fuller Test (ADF), which takes into consideration the possible correlation of the residuals for the following regressions:

$$\Delta Y_t = \Phi Y_{t-1} + \sum_{i=1}^{m} \alpha_i \Delta Y_{t-i} + \beta_1 + \beta_2 t + \varepsilon_t.$$

Using stocks from the major UK companies (FTSE 100) for illustration, the null hypothesis of stochastic non stationarity (unit root if $\Phi=0$) is rejected in the three cases below in Table 3, with a 1% level of confidence.

TABLE 3

| | ADF Test for FTSE 100 | | | | | |
|---|---|---|---|---|---|---|
| ADF test | Min | 1st Qu. | Median | Mean | 2nd Qu. | Max |
| $\beta_1, \beta_2 = 0$ | −18.66 | −10.36 | −8.365 | −8.782 | −7.079 | −4.418 |
| $\beta_1 \neq 0, \beta_2 = 0$ | −18.71 | −10.48 | −8.551 | −9.001 | −7.188 | −4.444 |
| $\beta_1, \beta_2 \neq 0$ | −18.71 | −10.49 | −8.571 | −9.053 | −7.188 | −4.459 |

Now that we have acquired confidence on the stationarity of $Y_t$, we follow the Box-Jenkins methodology to find a suitable time series model to describe it. Both the autocorrelation and partial autocorrelation functions decay exponentially, which suggests that an ARMA model could be appropriate for $Y_t$. A general ARMA(p,q) model is in the form:

$$Y_t = \sum_{i=1}^{p} \alpha_i Y_{t-i} + \sum_{i=1}^{q} b_i \varepsilon_{t-1} + \varepsilon_t$$

We calculate the Akaike Criterion (AIC) to confirm the former assumption and find the best set of values for (p,q) (number of lags of the AR and MA regression).

TABLE 4

Mean AIC

| Model | AIC |
|---|---|
| AR(1) | −44850 |
| MA(1) | −44690 |
| ARMA(1,1) | −45010 |
| ARMA(1,2) | −45030 |

According to the values found in Table 4, we eliminate the AR(1) and MA(1) models. The AIC criterion is slightly higher for ARMA(1,1) compared to ARMA(1,2). However, we did not see any improvement in quality when adding an additional MA term. Hence we choose the following model for $Y_t$:

$$Y_t = aY_{t-1} + b\epsilon_{t-1} + \epsilon_t.$$

It is noted that the particular model for $Y_t$ here is exemplary. The disclosed technology is not limited to using ARMA(1,1), and other embodiments of modelling $Y_t$ are contemplated.

Figure 30:
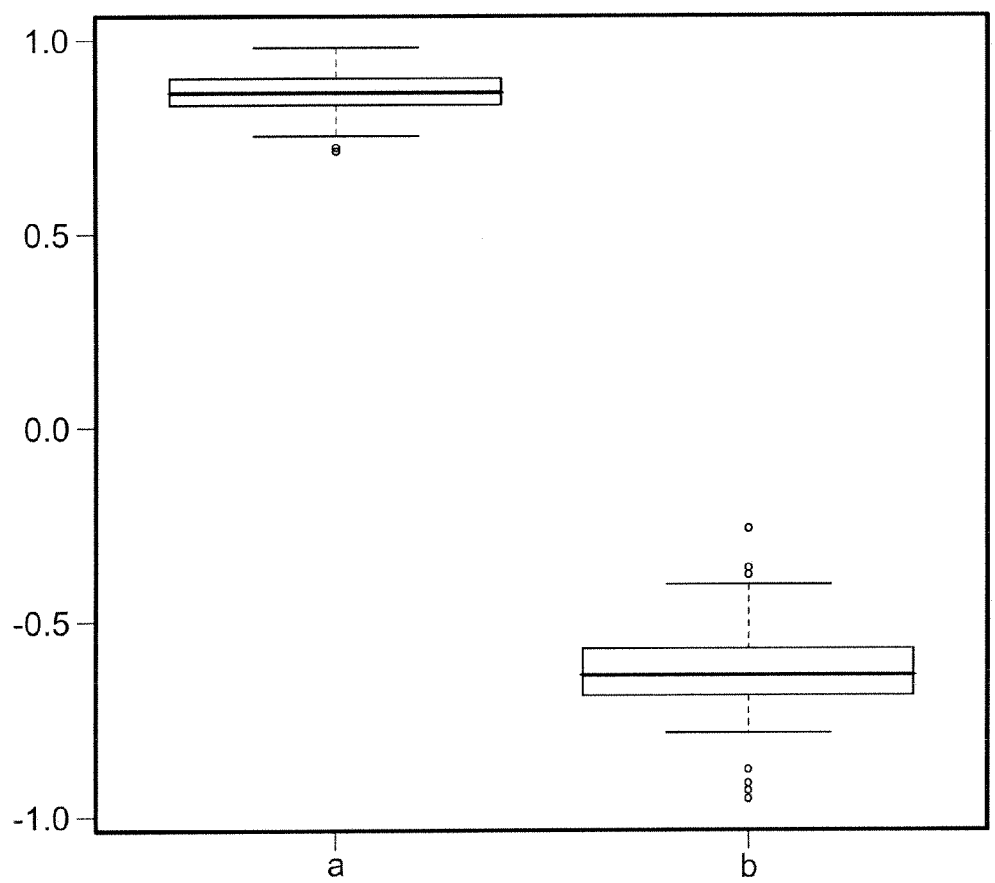
FIG. 30 illustrates ARMA coefficients for modelling missing values of $Y_n$.
Figure 31:
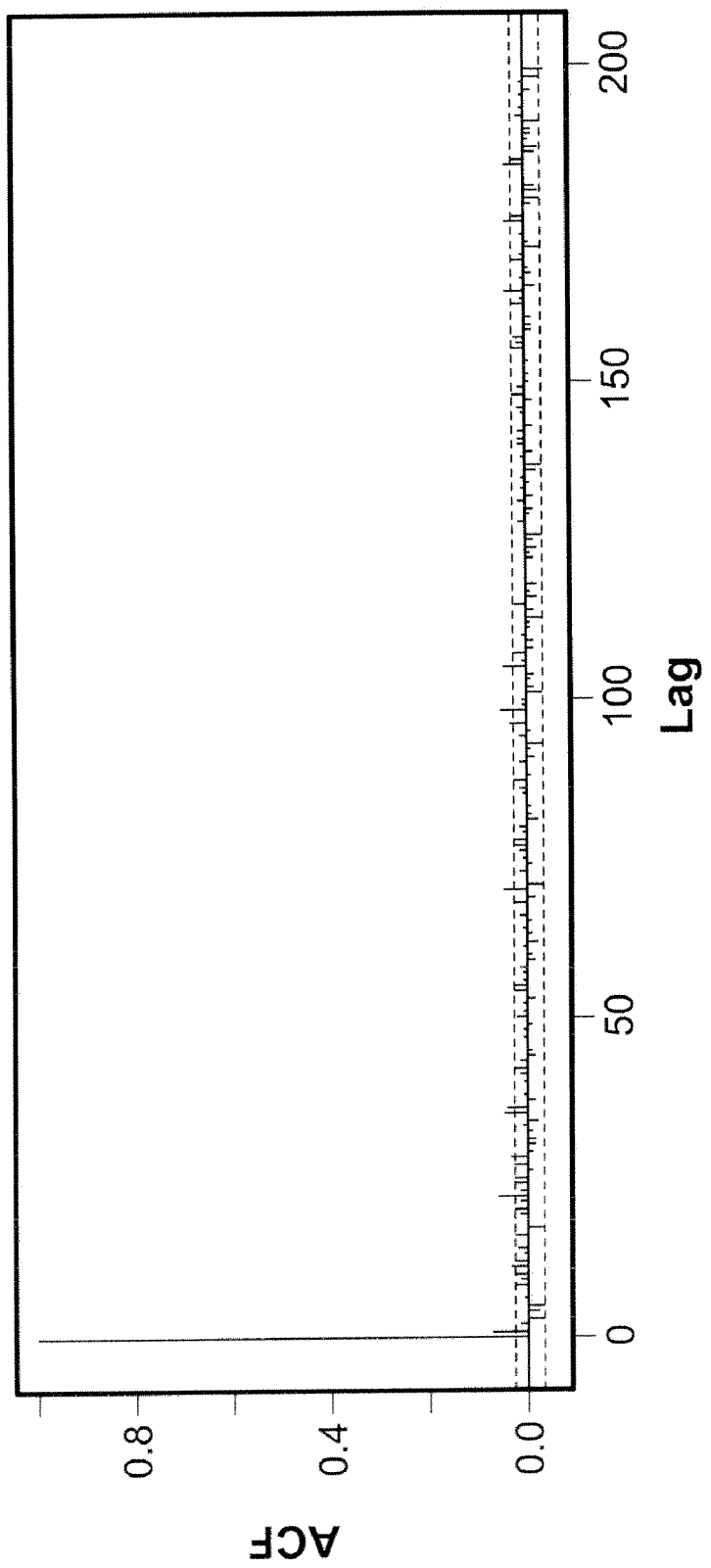
FIG. 31 illustrates autocorrelation values for the residuals of the regressions $\Delta Y_i$.

As shown in FIG. 30, the AR and MA coefficients are very similar across stocks and exchanges. The autoregressive coefficient is fairly high, which indicates an explosive behaviour for the time series $Y_t$. The MA term is negative, which shows that there is a mean reverting component in $Y_t$. The autocorrelation plots of the residuals for the regressions $\Delta Y_t$ are close to white noise, as shown in the FIG. 31.

Results

Using the model $Y_t = aY_{t-1} + b\epsilon_{t-1} + \epsilon$, for the specific component and $\nabla_{ti}$ for the market component, we computed predictions of the next immediate time bin t after the last time bin t−1 having intraday trading volume information. Our benchmark is the classical approach based on predicting the volume as an average of the previous days trading volume in the same time bin.

$$X_{ti}^j = \frac{1}{D}\sum_{d=1}^{D} X_{ti}^{j-d} + \gamma_{ti}^j$$

In order to evaluate the predictive power of our model, we calculate two quantities for each stock:

$$R_i^2 = 1 - \frac{\text{Var}(\varepsilon_i)}{\text{Var}(X_i)} \text{ and } P_i = 1 - \frac{\text{Var}(\varepsilon_i)}{\text{Var}(\gamma_i)} \text{ for } D = 15$$

previous days.

P describes the improvement given by our methodology compared to the benchmark's static predictions. The following tables summarize our results (median values of $R^2$ and P across stocks) for several exchanges. We slightly modified our model for Tokyo and Hong-Kong to account for the midday break in trading in these exchanges.

TABLE 5

$R^2$ across Exchanges

| Universe | Min | 1st Qu. | Median | Mean | 2nd Qu. | Max |
|---|---|---|---|---|---|---|
| FTSE 100 | 0.09 | 0.35 | 0.39 | 0.39 | 0.44 | 0.59 |
| FTSE MidCap | −0.08 | 0.16 | 0.28 | 0.26 | 0.35 | 0.55 |
| FTSE Small | −0.12 | 0.01 | 0.03 | 0.05 | 0.07 | 0.34 |

TABLE 5-continued $R^2$ across Exchanges

| Universe | Min | 1st Qu. | Median | Mean | 2nd Qu. | Max |
|---|---|---|---|---|---|---|
| Cap | | | | | | |
| DAX 30 | 0.18 | 0.28 | 0.31 | 0.32 | 0.37 | 0.44 |
| DAX MidCap | 0.07 | 0.16 | 0.26 | 0.25 | 0.30 | 0.53 |
| Cac 40 | 0.21 | 0.38 | 0.44 | 0.43 | 0.49 | 0.59 |
| Euronext 100 | 0.04 | 0.27 | 0.39 | 0.36 | 0.47 | 0.58 |
| Milan MIB 30 | −0.41 | 0.04 | 0.11 | 0.14 | 0.20 | 0.53 |
| Spain | −0.12 | 0.21 | 0.33 | 0.31 | 0.42 | 0.56 |
| NYSE | −0.20 | 0.22 | 0.32 | 0.31 | 0.41 | 0.67 |
| NASDAQ | −0.16 | 0.13 | 0.23 | 0.24 | 0.34 | 0.62 |
| Korea (200 stocks) | 0.01 | 0.27 | 0.36 | 0.33 | 0.41 | 0.53 |
| Tokyo (300 stocks) | −0.03 | 0.24 | 0.33 | 0.33 | 0.42 | 0.74 |
| Hong Kong | −0.04 | 0.42 | 0.49 | 0.46 | 0.55 | 0.68 |

TABLE 6

P across Exchanges

| Universe | Min | 1st Qu. | Median | Mean | 2nd Qu. | Max |
|---|---|---|---|---|---|---|
| FTSE 100 | −0.23 | 0.20 | 0.27 | 0.27 | 0.33 | 0.58 |
| FTSE MidCap | −0.20 | 0.14 | 0.18 | 0.18 | 0.24 | 0.50 |
| FTSE Small Cap | −2.81 | 0.06 | 0.13 | 0.08 | 0.18 | 0.45 |
| DAX 30 | −0.44 | 0.22 | 0.26 | 0.25 | 0.33 | 0.46 |
| DAX MidCap | −0.03 | 0.17 | 0.26 | 0.26 | 0.34 | 0.62 |
| Cac 40 | −0.76 | 0.21 | 0.27 | 0.22 | 0.31 | 0.44 |
| Euronext 100 | −0.76 | 0.16 | 0.26 | 0.22 | 0.32 | 0.46 |
| Milan MIB 30 | −0.55 | 0.04 | 0.12 | 0.10 | 0.20 | 0.56 |
| Spain | −1.96 | 0.08 | 0.14 | 0.01 | 0.18 | 0.29 |
| NYSE | −0.14 | 0.24 | 0.34 | 0.34 | 0.45 | 0.78 |
| NASDAQ | −0.10 | 0.17 | 0.29 | 0.29 | 0.39 | 0.78 |
| Korea (200 stocks) | 0.07 | 0.24 | 0.30 | 0.29 | 0.34 | 0.48 |
| Tokyo (300 stocks) | 0.01 | 0.15 | 0.24 | 0.25 | 0.35 | 0.56 |
| Hong Kong | −0.06 | 0.25 | 0.31 | 0.31 | 0.41 | 0.58 |

Figure 33:
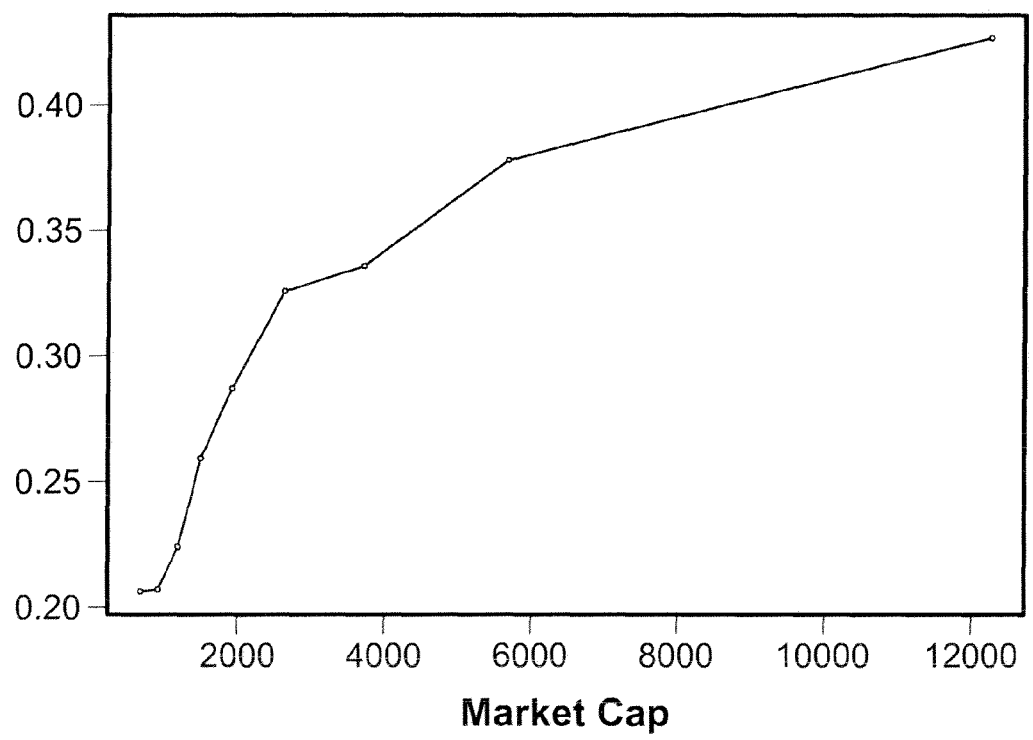
FIG. 33 illustrates the relationship between the $R^2$ values and market cap for the components of FTSE 350.

Tables 5 and 6 show a strong correlation between the market cap and the quality of our predictions: the higher the market cap of the stock, the more predictable its trading volume will be. This is confirmed by the FIG. 33, which shows the dependence between the $R^2$ values and the market cap for the components of FTSE 350.

The model $Y_t = aY_{t-1} + b\epsilon_{t-1} + \epsilon_t$ for predicting future values of $Y_t$ is a recursive model, in that the computation of $Y_t$ for a time bin t is based on the value of $Y_{t-1}$ for a previous time bin t−1. In this embodiment, to generate predictions for the remaining daily volume profile for a single stock, given the trading volume of the stock up to the time of prediction, we extend the recursive approach by injecting our prediction $\hat{Y}_{t+1}$ for the next 15 minute time bin in the model as if it was the realised value of the specific part $Y_{t+1}$, which gives an estimate of $Y_{t+2}$. We iterate this procedure to produce estimators for all the remaining time bins of the day. The mean reverting term of our model is now zero, as we can not compare our predictions to the real values. We call this routine "Method 1." Our AR coefficient is less than 1 for all the stocks. Thus, in Method 1, $\hat{Y}_{t+k} = a^k Y_t$. As a consequence, the further away our horizon is, the smaller the contribution of the specific part Y will be. For example, if we generate a prediction at 10 a.m. for the trading volume at 4 p.m., our prediction will essentially be the market component V.

Figure 32:
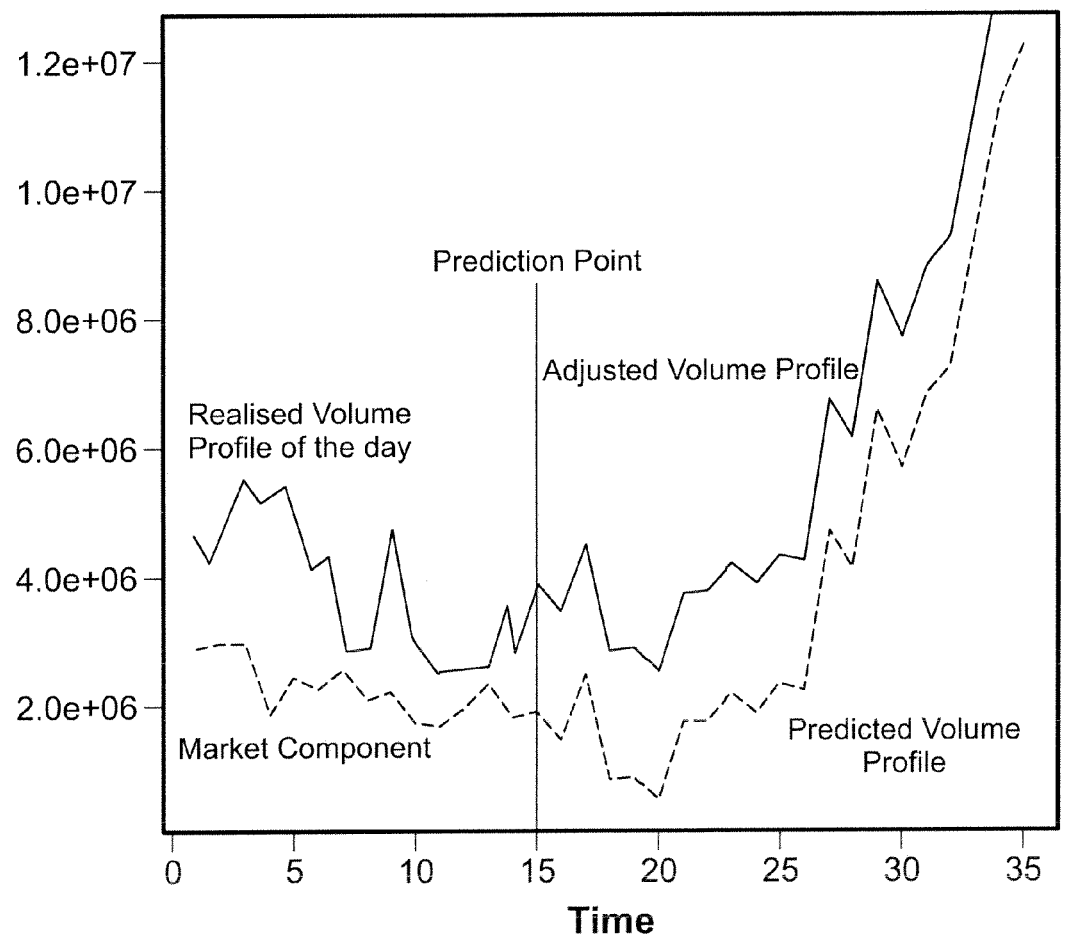
FIG. 32 illustrates the an adjustment of predicted trading volume based on the actual volume that has been traded between the market open time and the time the prediction is computed.

A possible improvement to Method 1 could be to adjust the market component based on the volume that has been traded between the open and the prediction point. The idea being that if volumes are higher than average in a given day, they will continue to be high throughout the day. In one embodiment, we add $C_t$=median($Y_k$, k=1, ..., t–1) to our predictions for the remaining profile of the day, as illustrated in FIG. 32. We will refer to this adjustment as "Method 2."

When comparing the results of Method 1 and Method 2, we found that Method 2 gives better results only after some point in the day. For example, early in the morning, there is no improvement in using Method 2, as we have only a few time bins of information, which is generally not enough to evaluate the deviation of today's volume profile from the static market component. In another embodiment, we can multiply our adjustment $C_t$ by a factor that reflects the confidence that we have on the excess trading volume from the market open time to the prediction point t. This factor is heuristic: t/T, where T is the total number of time bins in a day. This alternative way to take into account the excess of volume is called "Method 3."

Figure 34:
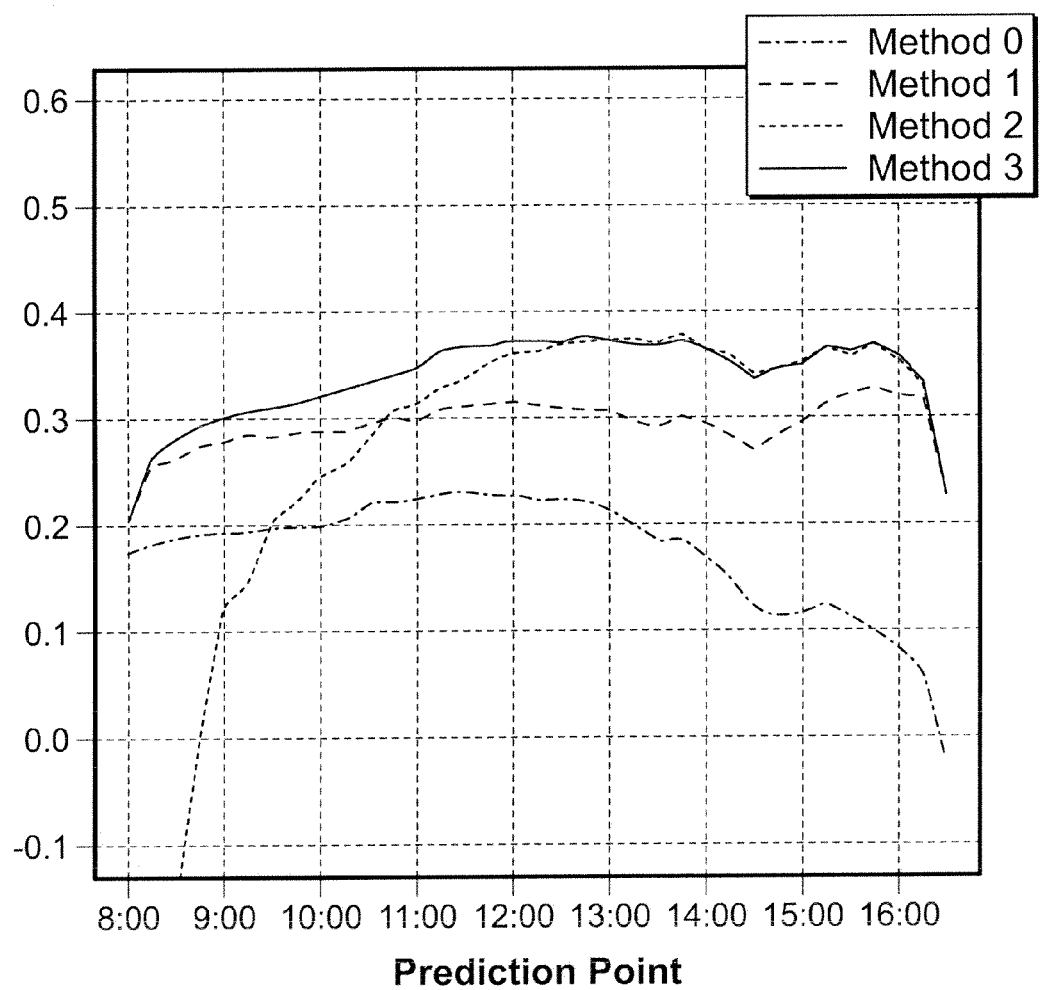
FIG. 34 illustrates predictions for remaining volume profile for the day using the benchmark method and Methods 1-3.
Figure 35:
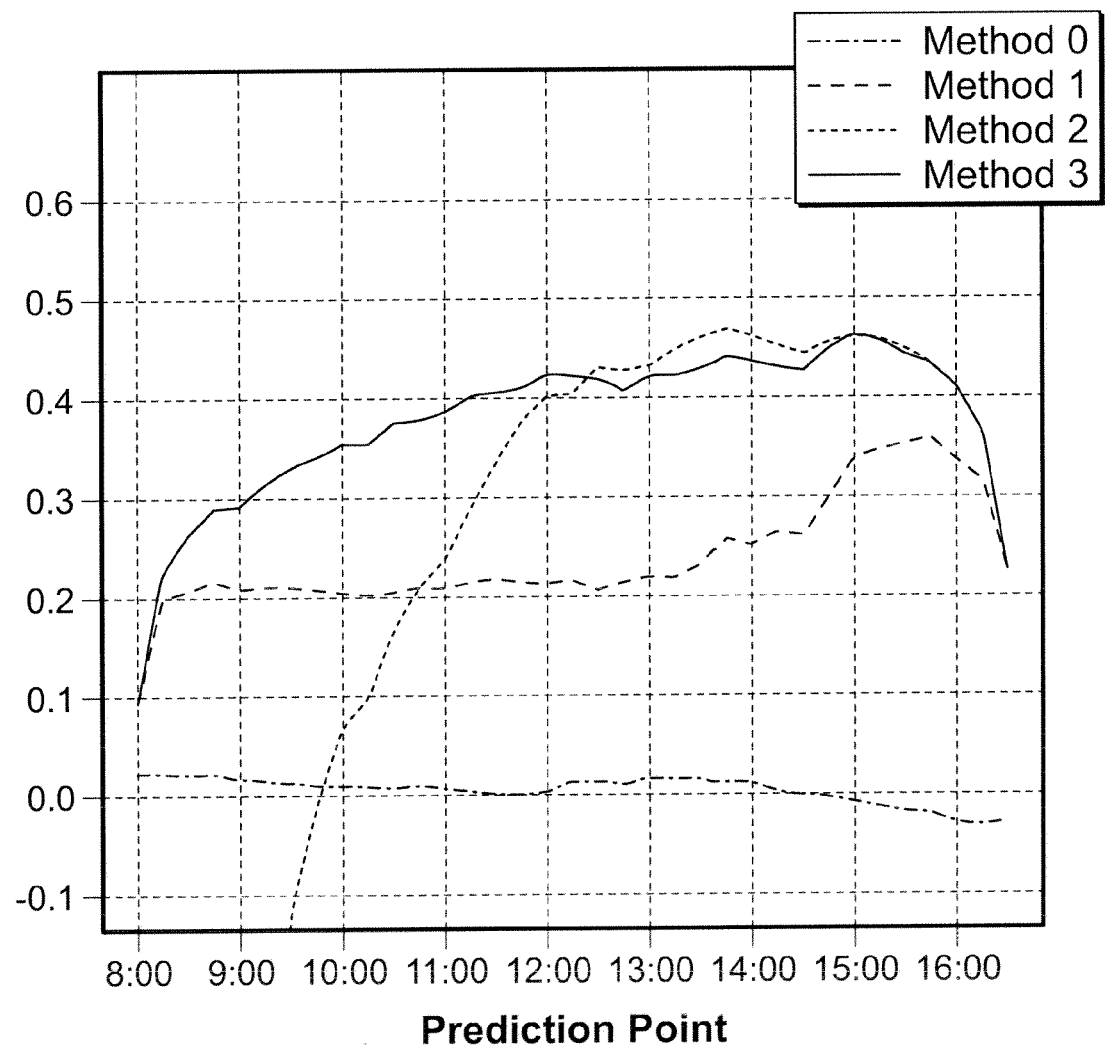
FIG. 35 illustrates predictions for total remaining volume for the day using the benchmark method and Methods 1-3.

The median $R^2$ of these 3 methods for both the remaining volume profile and the total remaining volume of the day are given in FIGS. 34 and 35 for different prediction points. We compare them to the benchmark method of taking the historical average in each bin ("Method 0"). In the particular scenario illustrated in FIGS. 34 and 35, Method 3 is the best alternative, since it gives smaller errors than Method 1 for all prediction points.

CONCLUSION

As shown above, the Intraday Volume Decomposition Model produces better estimations for the volume traded in the next time bin than the classical n-day moving average prediction for the large majority of stocks. In various embodiments, we extended the model to longer-term predictions using an adjustment technique that takes into consideration excess or shortages of volume in a particular day. The parameters of the model, as well as its performance, are fairly stable across exchanges.

Figure 36:
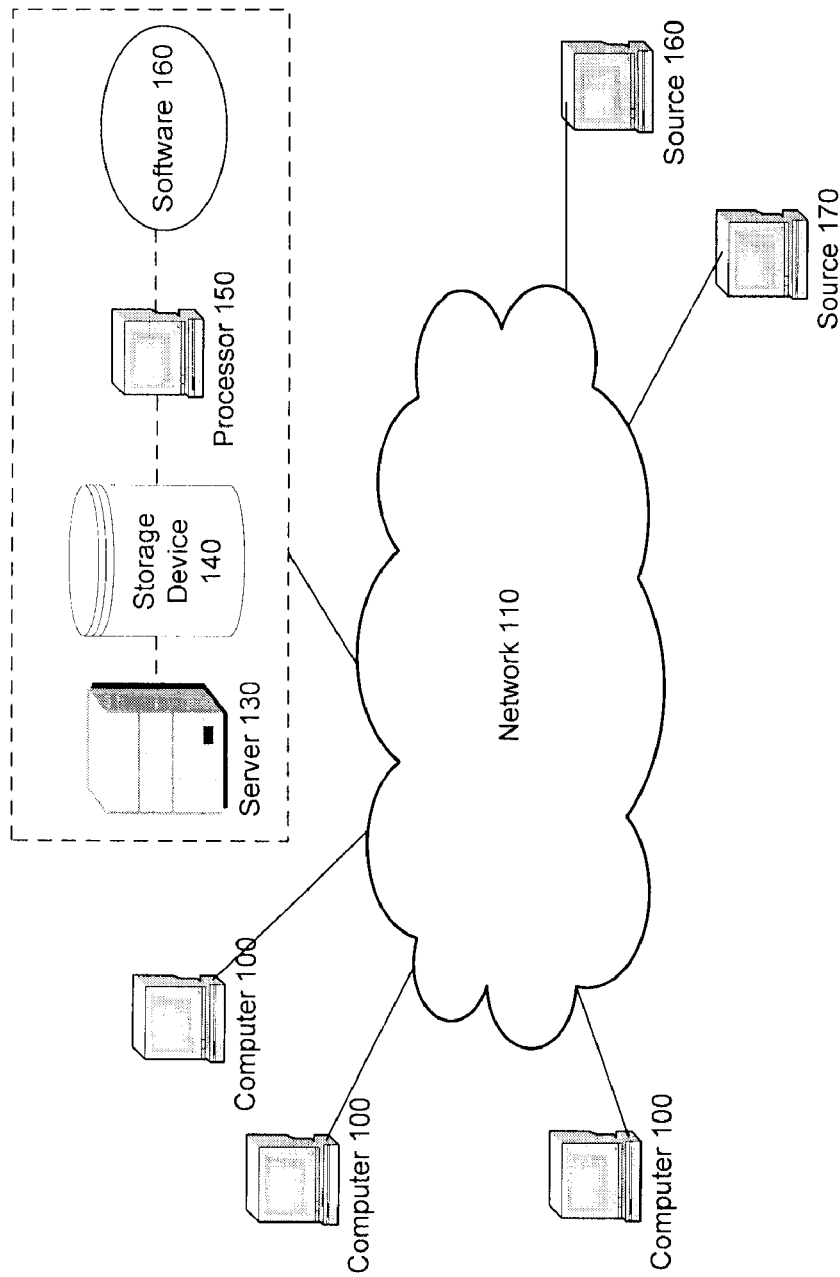
FIG. 36 depicts a computer based system for processing data according to an embodiment of the invention.

Embodiments of the present invention comprise computer components and computer-implemented steps that will be apparent to those skilled in the art. For example, calculations and communications can be performed electronically. An exemplary system is depicted in FIG. 36. As shown, computers 100 communicate via network 110 with a central server 130. A plurality of sources of data 160, 170 relating to, for example, trading volume data, also communicate via network 110 with a central server 130, processor 150, and/or other component to calculate and transmit, for example, volume forecast data. The server 130 may be coupled to one or more storage devices 140, one or more processors 150, and software 160.

Other components and combinations of components may also be used to support processing data or other calculations described herein as will be evident to one of skill in the art. Server 130 may facilitate communication of data from a storage device 140 to and from processor 150, and communications to computers 100. Processor 150 may optionally include local or networked storage (not shown) which may be used to store temporary information. Software 160 can be installed locally at a computer 100, processor 150 and/or centrally supported for facilitating calculations and applications.

For ease of exposition, not every step or element of the present invention is described herein as part of a computer system and/or software, but those skilled in the art will recognize that each step or element may have (and typically will have) a corresponding computer system or software component. Such computer system and/or software components are therefore enabled by describing their corresponding steps or elements (that is, their functionality), and are within the scope of the present invention.

Moreover, where a computer system is described or claimed as having a processor for performing a particular function, it will be understood by those skilled in the art that such usage should not be interpreted to exclude systems where a single processor, for example, performs some or all of the tasks delegated to the various processors. That is, any combination of, or all of, the processors specified in the claims could be the same processor. All such combinations are within the scope of the invention.

The present invention has been described by way of example only, and the invention is not limited by the specific embodiments described herein. As will be recognized by those skilled in the art, improvements and modifications may be made to the invention and the illustrative embodiments described herein without departing from the scope or spirit of the invention.

References (all of the following references are incorporated herein by reference in their entirety; however, neither their mention nor their incorporation should be considered an admission that they are prior art to the present invention):

[1] *Trading Volume: Definitions, Data Analysis, and Implications of Portfolio Theory*—Jiang Wang and Andrew Lo, 2000.

[2] *Trading Volume Trend, Investor Sentiment, and Stock Returns*—Share A. Johnson, Adam Y. C. Lei, Ji-Chai Lin, and Gary C. Sanger, 2006.

[3] *Trading Volume and Serial Correlation in Stock Returns*—Jiang Wing, John Campbell, and Sanford Grossman, 1993.

What is claimed is:

1. A system comprising:
   memory operable to store at least one program; and
   at least one processor communicatively coupled to the memory, in which the at least one program, when executed by the at least one processor, causes the at least one processor to:
   access and process data regarding the receipt of time series data regarding securities trading volume for a securities market for a period, wherein said time series data comprises a collection of numerical data points over said period;
   determine market level effects, wherein said market level effects comprise a collection of numerical data points over said period reflecting influences on said time series data based on at least one market pattern;
   determine residual time series data by adjusting said time series data based on said market level effects;
   generate a fitted autoregressive moving average model by fitting an autoregressive moving average model to said residual time series data;
   calculate an autoregressive moving average forecast for a day subsequent to said period based on said fitted autoregressive moving average model; and
   estimate a securities trading volume for said securities market for said day subsequent to said period based on said autoregressive moving average forecast.

2. A system as in claim 1, wherein adjusting said time series data based on said market level effects comprises identifying seasonal patterns in said time series data, and adjusting said time series data based on said seasonal patterns.

3. A system as in claim 2, wherein said seasonal patterns comprise one or more of: annual patterns, monthly patterns, and weekly patterns.

4. A system as in claim 2, wherein said seasonal patterns are identified using a Locally Estimated Scatterplot Smoothing (LOESS) method.

5. A system as in claim 1, wherein adjusting said time series data based on said market level effects comprises identifying long term trends and local variance in said time series data and adjusting said time series data based on said long term trends and local variance.

6. A system as in claim 1, wherein adjusting said time series data based on said market level effects comprises identifying effects due to special days in said time series data and adjusting said time series data based on said effects due to special days.

7. A system as in claim 6, wherein adjusting said time series data based on said effects due to special days comprises replacing turnover data for special days with turnover data based on a moving average.

8. A system as in claim 7, wherein said moving average is a ten day moving average.

9. A system as in claim 1, wherein fitting said autoregressive moving average model to residual time series data comprises minimizing Akaike information criteria.

10. A system as in claim 1, wherein said autoregressive moving average model is an ARMA (1,2) model.

11. A system as in claim 1, wherein estimating securities trading volume for said securities market for said day subsequent to said period comprises adjusting said autoregressive moving average forecast for said day subsequent to said period based on said market level effects.

12. A system comprising:
   memory operable to store at least one program; and
   at least one processor communicatively coupled to the memory, in which the at least one program, when executed by the at least one processor, causes the at least one processor to:
      access and process data regarding the receipt of time series data regarding trading volume for a security traded in a securities market for a period, wherein said time series data comprises a collection of numerical data points for said period;
      determine market level effects and earnings announcement effects based on said time series data, wherein said market level effects comprise a collection of numerical data points over said period reflecting influences on said time series data based on at least one market pattern and said earnings announcement effects comprise a collection of numerical data points over said period reflecting influences on said time series data based on at least one earnings announcement;
      determine residual time series data by adjusting said time series data based on said market level effects and earnings announcement effects;
      generate a fitted autoregressive moving average model by fitting an autoregressive moving average model to said residual time series data;
      calculate an autoregressive moving average forecast for a day subsequent to said period based on said fitted autoregressive moving average model; and
      estimate a securities trading volume for said security for said day subsequent to said period based on said autoregressive moving average forecast.

13. A system as in claim 12, wherein adjusting said time series data based on said market level effects comprises identifying seasonal patterns in said time series data, and adjusting said time series data based on said seasonal patterns.

14. A system as in claim 13, wherein said seasonal patterns comprise one or more of: annual patterns, monthly patterns, and weekly patterns.

15. A system as in claim 13, wherein said seasonal patterns are identified using a Locally Estimated Scatterplot Smoothing (LOESS) method.

16. A system as in claim 12, wherein adjusting said time series data based on said market level effects comprises identifying long term trends and local variance in said time series data, and adjusting said time series data based on said long term trends and local variance.

17. A system as in claim 12, wherein adjusting said time series data based on said market level effects comprises identifying effects due to special days in said time series data, and adjusting said time series data based on said effects due to special days.

18. A system as in claim 17, wherein adjusting said time series data based on said effects due to special days comprises replacing turnover data for special days with turnover data based on a moving average.

19. A system as in claim 18, wherein said moving average is a ten day moving average.

20. A system as in claim 12, wherein fitting said autoregressive moving average model to residual time series data comprises minimizing Akaike information criteria.

21. A system as in claim 12, wherein said autoregressive moving average model is an ARMA (1,2) model.

22. A system as in claim 12, wherein adjusting said time series data based on said earnings announcement effects comprises replacing turnover data for earnings and dividend announcement days with turnover data based on a moving average.

23. A system as in claim 12, wherein estimating securities trading volume for said security for said day subsequent to said period comprises adjusting said autoregressive moving average forecast for said day subsequent to said period based on said market level effects and said earnings announcement effects.

24. A system comprising:
   memory operable to store at least one program; and
   at least one processor communicatively coupled to the memory, in which the at least one program, when executed by the at least one processor, causes the at least one processor to:
      access and process data regarding the receipt of time series data regarding securities trading volume for a securities market for a first time bin, wherein said time series data comprises a collection of numerical data points over said first time bin;
      determine market level effects for said first time bin, wherein said market level effects for said first time bin comprise a collection of numerical data points over said first time bin reflecting influences on said time series data based on at least one market pattern;
      determine residual time series data for said first time bin by adjusting said time series data based on said market level effects for said first time bin; and
      estimate a trading volume for a security for a second time bin subsequent to said first time bin based on said residual time series data for said first time bin.

25. A system as in claim 24, wherein said market level effects for said first time bin comprise seasonal patterns.

26. A system as in claim 25, wherein said seasonal patterns comprise intraday patterns.

27. A system as in claim 24, wherein said processor further identifies said market level effects for said first time bin using principal component analysis decomposition.

28. A system as in claim 24, wherein said processor further:
determines a first model for predicting market level effects for said second time bin, wherein said market level effects for said second time bin comprise a collection of numerical data points over said second time bin reflecting influences on said trading volume for said security for said second time bin based on at least one market pattern;
computes market level effects for said second time bin based on said first model;
determines a second model for predicting residual time series data for said second time bin; and
computes residual time series data for said second time bin based on said second model.

29. A system as in claim 28, wherein said first model is based on earlier market level effects for said security.

30. A system as in claim 28, wherein said second model is an autoregressive moving average model.

31. A system as in claim 30, wherein determining said second model comprises minimizing Akaike information criteria.

32. A system as in claim 28, wherein said processor further estimates trading volume for said security for a third time bin subsequent to said second time bin based on said residual time series data for said second time bin.

33. A system as in claim 28, wherein estimating trading volume for said security for said second time bin is further based on said market level effects for said second time bin and said residual time series data for said second time bin.

34. A system as in claim 24, wherein estimating trading volume for said security for said second time bin is further based on an adjustment factor that is representative of one of: excess trading volume for said first time bin, and shortage of trading volume for said first time bin.

35. A system as in claim 34, wherein said adjustment factor is based on a median of said residual time series data for said first time bin.

36. A system as in claim 35, wherein said adjustment factor is proportional to a total number of time bins in a day.

37. A non-transitory computer readable storage medium having computer-executable instructions recorded thereon that, when executed on a computer, configure the computer to perform a method comprising:
electronically receiving time series data regarding securities trading volume for a securities market for a period, wherein said time series data comprises a collection of numerical data points over said period;
determining market level effects, wherein said market level effects comprise a collection of numerical data points over said period reflecting influences on said time series data based on at least one market pattern;
determining residual time series data by adjusting said time series data based on said market level effects;
generating a fitted autoregressive moving average model by fitting an autoregressive moving average model to said residual time series data;
calculating an autoregressive moving average forecast for a day subsequent to said period based on said fitted autoregressive moving average model; and
estimating a securities trading volume for said securities market for said day subsequent to said period based on said autoregressive moving average forecast for.

38. The non-transitory computer readable storage medium of claim 37, wherein adjusting said time series data based on said market level effects comprises identifying seasonal patterns in said time series data and adjusting said time series data based on said seasonal patterns.

39. The non-transitory computer readable storage medium of claim 38, wherein said seasonal patterns comprise one or more of: annual patterns, monthly patterns, and weekly patterns.

40. The non-transitory computer readable storage medium of claim 38, wherein said seasonal patterns are identified using a Locally Estimated Scatterplot Smoothing (LOESS) method.

41. The non-transitory computer readable storage medium of claim 37, wherein adjusting said time series data based on said market level effects comprises identifying long term trends and local variance in said time series data and adjusting said time series data based on said long term trends and local variance.

42. The non-transitory computer readable storage medium of claim 37, wherein adjusting said time series data based on said market level effects comprises identifying effects due to special days in said time series data and adjusting said time series data based on said effects due to special days.

43. The non-transitory computer readable storage medium of claim 42, wherein adjusting said time series data based on said effects due to special days comprises replacing turnover data for special days with turnover data based on a moving average.

44. The non-transitory computer readable storage medium of claim 43, wherein said moving average is a ten day moving average.

45. The non-transitory computer readable storage medium of claim 37, wherein estimating securities trading volume for said securities market for said day subsequent to said period comprises adjusting said autoregressive moving average forecast for said day subsequent to said period based on said market level effects.

46. The non-transitory computer readable storage medium of claim 37, wherein fitting said autoregressive moving average model to residual time series data comprises minimizing Akaike information criteria.

47. The non-transitory computer readable storage medium of claim 37, wherein said autoregressive moving average model is an ARMA (1,2) model.

48. A non-transitory computer readable storage medium having computer-executable instructions recorded thereon that, when executed on a computer, configure the computer to perform a method comprising:
electronically receiving time series data regarding trading volume for a security traded in a securities market for a period, wherein said time series data comprises a collection of numerical data points over said period;
determining market level effects and earnings announcement effects based on said time series data, wherein said market level effects comprise a collection of numerical data points over said period reflecting influences on said time series data based on at least one market pattern and said earnings announcement effects comprise a collection of numerical data points over said period reflecting influences on said time series data based on at least one earnings announcement;
determining residual time series data by adjusting said time series data based on said market level effects and earnings announcement effects;
generating a fitted autoregressive moving average model by fitting an autoregressive moving average model to said residual time series data;

calculating an autoregressive moving average forecast for a day subsequent to said period based on said fitted autoregressive moving average model; and estimating a securities trading volume for said security for said day subsequent to said period based on said autoregressive moving average forecast.

49. The non-transitory computer readable storage medium of claim 48, wherein adjusting said time series data based on said market level effects comprises identifying seasonal patterns in said time series data and adjusting said time series data based on said seasonal patterns.

50. The non-transitory computer readable storage medium of claim 49, wherein said seasonal patterns comprise one or more of: annual patterns, monthly patterns, and weekly patterns.

51. The non-transitory computer readable storage medium of claim 49, wherein said seasonal patterns are identified using a Locally Estimated Scatterplot Smoothing (LOESS) method.

52. The non-transitory computer readable storage medium of claim 48, wherein adjusting said time series data based on said market level effects comprises identifying long term trends and local variance in said time series data and adjusting said time series data based on said long term trends and local variance.

53. The non-transitory computer readable storage medium of claim 48, wherein adjusting said time series data based on said market level effects comprises identifying effects due to special days in said time series data and adjusting said time series data based on said effects due to special days.

54. The non-transitory computer readable storage medium of claim 53, wherein adjusting said time series data based on said effects due to special days comprises replacing turnover data for special days with turnover data based on a moving average.

55. The non-transitory computer readable storage medium of claim 54, wherein said moving average is a ten day moving average.

56. The non-transitory computer readable storage medium of claim 48, wherein adjusting said time series data based on said earnings announcement effects comprises replacing turnover data for earnings and dividend announcement days with turnover data based on a moving average.

57. The non-transitory computer readable medium of claim 48, wherein estimating securities trading volume for said security for said day subsequent to said period comprises adjusting said autoregressive moving average forecast for said day subsequent to said period based on said market level effects and said earnings announcement effects.

58. The non-transitory computer readable storage medium of claim 48, wherein fitting said autoregressive moving average model to residual time series data comprises minimizing Akaike information criteria.

59. The non-transitory computer readable storage medium of claim 48, wherein said autoregressive moving average model is an ARMA (1,2) model.

60. A non-transitory computer readable storage medium having computer-executable instructions recorded thereon that, when executed on a computer, configure the computer to perform a method comprising:

electronically receiving time series data regarding securities trading volume for a securities market for a first time bin, wherein said time series data comprises a collection of numerical data points over said first time bin;

determining market level effects for said first time bin, wherein said market level effects for said first time bin comprise a collection of numerical data points over said first time bin reflecting influences on said time series data based on at least one market pattern;

determining residual time series data for said first time bin by adjusting said time series data based on said market level effects for said first time bin; and estimating a trading volume for a security for a second time bin subsequent to said first time bin based on said residual time series data for said first time bin.

61. The non-transitory computer readable storage medium of claim 60, wherein said method further comprises determining market level effects for said first time bin using principal component analysis decomposition.

62. The non-transitory computer readable storage medium of claim 60, wherein said method further comprises:

determining a first model for predicting market level effects for said second time bin, wherein said market level effects for said second time bin comprise a collection of numerical data points over said second time bin reflecting influences on said trading volume for said security for said second time bin based on at least one market pattern;

computing market level effects for said second time bin based on said first model;

determining a second model for predicting residual time series data for said second time bin; and computing residual time series data for said second time bin based on said second model.

63. The non-transitory computer readable storage medium of claim 62, wherein estimating trading volume for said security for said second time bin is further based on said market level effects for said second time bin and said residual time series data for said second time bin.

64. The non-transitory computer readable storage medium of claim 63, wherein said method further comprises estimating trading volume for said security for a third time bin subsequent to said second time bin based on said residual time series data for said second time bin.

65. The non-transitory computer readable storage medium of claim 62, wherein said first model is based on earlier market level effects for said security.

66. The non-transitory computer readable storage medium of claim 62, wherein said second model is an autoregressive moving average model.

67. The non-transitory computer readable storage medium of claim 66, wherein determining said second model comprises minimizing Akaike information criteria.

68. The non-transitory computer readable storage medium of claim 60, wherein estimating trading volume for said security for said second time bin is further based on an adjustment factor that is representative of one of: excess trading volume for said first time bin, and shortage of trading volume for said first time bin.

69. The non-transitory computer readable storage medium of claim 68, wherein said adjustment factor is based on a median of said residual time series data for said first time bin.

70. The non-transitory computer readable storage medium of claim 69, wherein said adjustment factor is proportional to a total number of time bins in a day.

71. The non-transitory computer readable storage medium of claim 60, wherein said market level effects for said first time bin comprise seasonal patterns.

72. The non-transitory computer readable storage medium of claim 71, wherein said seasonal patterns comprise intraday patterns.

* * * * *